United States Patent
Omura et al.

(10) Patent No.: US 7,116,355 B1
(45) Date of Patent: Oct. 3, 2006

(54) INSTANT PRINTER, PRINTING METHOD FOR USING THE SAME, COMBINATION PRINTER/ELECTRONIC STILL CAMERA SYSTEM

(75) Inventors: Hiroshi Omura, Asaka (JP); Yasuhiro Nishitani, Asaka (JP); Ko Aosaki, Asaka (JP); Yoshio Sugano, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/673,381

(22) PCT Filed: Apr. 12, 1999

(86) PCT No.: PCT/JP99/01918

§ 371 (c)(1),
(2), (4) Date: Oct. 16, 2000

(87) PCT Pub. No.: WO99/53374

PCT Pub. Date: Oct. 21, 1999

(30) Foreign Application Priority Data

| Apr. 15, 1998 | (JP) | ................................. 10/104517 |
| May 11, 1998 | (JP) | ................................. 10/127117 |
| Sep. 10, 1998 | (JP) | ................................. 10/256634 |

(51) Int. Cl.
- H04N 5/225 (2006.01)
- H04N 11/00 (2006.01)
- H04N 7/00 (2006.01)

(52) U.S. Cl. .................... 348/207.2; 348/552

(58) Field of Classification Search ............ 348/207.2, 348/552, 333.01, 373, 374, 375, 376; 358/1.1, 358/906; 347/224, 225, 226, 220, 223, 234, 347/235, 2, 3, 4, 80, 400, 693, 238, 241, 347/244, 256, 258; 349/20, 23, 62; 396/20–23
See application file for complete search history.

(56) References Cited

U.S. PATENT DOCUMENTS

| 5,481,288 A * | 1/1996 | Keeling et al. | ................ 347/80 |
| 5,790,240 A * | 8/1998 | Ishikawa et al. | ............. 355/68 |
| 5,805,178 A * | 9/1998 | Silverbrook | ................. 347/15 |
| 5,875,034 A * | 2/1999 | Shintani et al. | ............. 358/296 |
| 6,048,045 A * | 4/2000 | Nohata et al. | .................. 347/7 |
| 6,308,892 B1 * | 10/2001 | Swartz et al. | .......... 235/472.01 |
| 2002/0080250 A1 * | 6/2002 | Ogawa et al. | .............. 348/232 |

FOREIGN PATENT DOCUMENTS

| JP | 3-28837 | 2/1991 |

(Continued)

*Primary Examiner*—David Ometz
*Assistant Examiner*—Yogesh Aggarwal
(74) *Attorney, Agent, or Firm*—Young & Thompson

(57) ABSTRACT

Printing light beams from a printing head that is driven based on image data are used for recording a latent image in a predetermined exposure area on an instant film. The instant film is exposed through an exposure opening formed through a case of a film pack. The printing head projects the printing light beams linearly along a main scan direction while moving in a sub scan direction perpendicular to the main scan direction. An illumination range of the printing light beams is determined to be wider than the exposure area in the main and sub scan directions, in consideration of clearances between the case and the instant film. So the entire exposure area is exposed even where the instant film deviates inside the case. A light-shielding housing for covering up a moving range of the printing head in a light-tight fashion is formed integrally with a pack loading chamber for loading the film pack.

13 Claims, 18 Drawing Sheets

FOREIGN PATENT DOCUMENTS

| | | |
|---|---|---|
| JP | 3-192344 | 8/1991 |
| JP | 4-29128 | 1/1992 |
| JP | 4194832 | 7/1992 |
| JP | 4-308828 | 10/1992 |
| JP | 683243 | 3/1994 |
| JP | 8-137028 | 5/1996 |
| JP | 8271995 | 10/1996 |
| JP | 10-48739 | 2/1998 |
| JP | 10-55489 | 2/1998 |
| JP | 10224594 A * | 8/1998 |

* cited by examiner

INSTANT PRINTER, PRINTING METHOD FOR USING THE SAME, COMBINATION PRINTER/ELECTRONIC STILL CAMERA SYSTEM

FIELD OF THE ART

The present invention relates to an instant printer that makes printing on instant film based on electronic image data, and a printing method for use in the instant printer. The present invention also relates to an electronic still camera incorporated with a printer, that memorizes image data of a subject photographed through an image sensor, and records a subject image on instant film based on the memorized image data.

BACKGROUND ARTS

Portable electronic still cameras are widely used, which convert an optical image of a subject to an electric image signal through a CCD image sensor or the like, convert the image signal to digital image data, and write the image data frame by frame as still images in a memory. Also an instant printer that uses instant film for printing hard copies of still images based on their image data, and an electronic still camera incorporated with such an instant printer have been known.

In the above mentioned instant printers, so-called monosheet type instant films are widely used. The mono-sheet type instant film is mainly constituted of a protective sheet for an image receiving photosensitive layer, the image receiving photosensitive layer, an image transferred layer and a protective sheet for the image transferred layer, which are laminated in this order from a photosensitive surface. A pod containing processing fluid is provided along a leading end of the instant film. While the instant film after exposed is being ejected through a pair of spread rollers, the pod is ruptured and the processing fluid is spread between the image receiving photosensitive layer and the image transferred layer. Thereby, an image formed on the image receiving photosensitive layer is transferred to the image transferred layer, so a positive image is developed in a few minutes. The mono-sheet type instant film is further classified into a transparent type where the image appears on the opposite side from the photosensitive surface, and a reflective type where the image appears on the photosensitive surface. Beside the mono-sheet type, another kind of instant film, called peel-apart type, may be used in the instant printer. In the peel-apart type instant film, a negative sheet (an image receiving photosensitive layer) is exposed and then put on a positive sheet (an image transferred layer). Then, an image is transferred to the positive sheet by pressing these sheets to each other while spreading the processing fluid between these sheets. Thereafter, the positive sheet is peeled apart from the negative sheet. The instant film is usually provided as a film pack, wherein a plurality of sheets of instant films are packaged in a case, and the case and all are loaded in an instant camera or the like. The film pack is designed such that when a light-shielding sheet is advanced out the case after the film pack is loaded, a predetermined exposure area on the photosensitive side is exposed through an exposure opening that is formed through the case.

The instant printer and the electronic still camera incorporated with the printer comprise a pack loading chamber for loading the film pack, an exposure unit for exposing the photosensitive surface of the instant film, a film developing ejecting mechanism including the spread rollers that spread the processing fluid while feeding the exposed instant film to the outside, many kinds of operating members, a display section for displaying an image to print, many kinds of circuit sections, mechanical frames for placing and securing these elements, and an outer cover members.

Among the above mechanisms, the film developing ejecting mechanism fundamentally has the same constructions and the same functions as that used in conventional instant cameras, such as disclosed in JPA No. 4-194832. Exemplary of the exposure unit is disclosed in JPA Nos. 6-83243 and 8-271995, wherein a color image is printed by a printing head with a light emitting element array that moves relative to the instant film while projecting red, green and blue printing light beams. The light emitting element array consists of a plurality of light emitting elements that are arranged in a line and emit light beams responsive to processed image data.

In the above mentioned film pack of the instant films, the instant films are a little smaller than an internal size of the case, to provide clearances between the instant films and the casing, for allowing the exposed instant film to be sent out or drawn out smoothly. Because there are clearances, the instant films may deviate inside the case if a shock or another factor is applied. Therefore, the exposure area is not always placed in a predetermined position behind the exposure opening of the case.

If the instant film deviates, some part of the exposure area would not be exposed to printing light. Since the unexposed part of the exposure area will be colored black when the image is developed to be positive, it damages the image. Also in a printer where the instant film is individually loaded, the same problem may be caused by the deviation inside a film loading chamber.

Meanwhile, the photosensitive surfaces of the instant films loaded in the instant printer or in the printer-incorporated electronic still camera should be completely shielded from ambient light. However, there are so many kinds of light that might reach the photosensitive surfaces of the instant films, such as light leaking through gaps between the cover members and the various operation members, light leaking through joints between the cover members, and light leaking from a illumination device that illuminates an LCD panel from the back. Therefore, it has been difficult to shield the photosensitive surfaces completely from light.

The present invention is made to solve the above problems, and has an object to provide an instant printer and a printing method for use in the instant printer, wherein the exposure area would be entirely exposed even if the instant film deviates inside the case or the printer when the instant film is exposed by the printing head.

The present invention also has an object to provide an instant printer that effectively shield ambient light that might reach the photosensitive surfaces of the instant films.

Another object of the present invention is to provide a printer-incorporated electronic still camera, which is capable of writing and reading photographed image data on external memories.

DISCLOSURE OF THE INVENTION

In an instant printer that comprises an exposure device for projecting printing light based on image data, and a pair of spread rollers, and in a printing method for use in the instant printer, wherein the instant printer records a latent image in an exposure area of a predetermined size on an instant film that includes a processing fluid, by exposing the instant film to the printing light, and develops the latent image into a positive image by spreading the processing fluid over the exposed instant film through the spread rollers, the present invention is characterized in that an illumination range of the printing light on the instant film by the exposure device is determined to be larger than the exposure area, so the entire exposure area may be exposed even where the instant film deviates from a predetermined position relative to the exposure device.

Where the instant film is contained in a case that is formed with an exposure opening for exposing the exposure area, the size of the illumination range relative to the exposure area is determined in accordance with clearances provided between the case and the instant film.

An instant printer according to the present invention comprises an exposure device that consists of a printing head for projecting the printing light linearly along a main scan direction, and a scanning mechanism for moving the printing head relative to the instant film in a sub scan direction perpendicular to the main scan direction, wherein an illumination range of the printing light by the printing head is longer in the main scan direction than a length in the main scan direction of the exposure area, whereas a sub scanning range by the scanning mechanism is longer than a length in the sub scan direction of the exposure area.

An instant printer according to the present invention comprises a light-shielding housing that covers up at least a moving range of the printing head in a light-tight fashion. The light-shielding housing preferably covers up the scanning mechanism besides the moving range of the printing head.

According to another aspect of the present invention, in an electronic still camera comprising an imaging device for photographing a subject, an exposure device for exposing an instant film that includes a processing fluid on the basis of image data of the subject photographed through the imaging device, and a pair of spread rollers for ejecting the exposed instant film out of a camera body while spreading the processing fluid over the exposed instant film, the electronic still camera comprises a device for connecting an external memory to the instant printer, a device for compressing image data of a subject photographed through the imaging device and writing it on the connected external memory, and a device for expanding compressed image data that is read out from the external memory, wherein the exposure device may be driven based on the image data read out from the external memory. The external memory is preferably a memory card that is removably attachable to the camera body.

PREFERRED EMBODIMENTS OF THE INVENTION

The present invention will be described in more detail with reference to the accompanying drawings.

Figure 1:
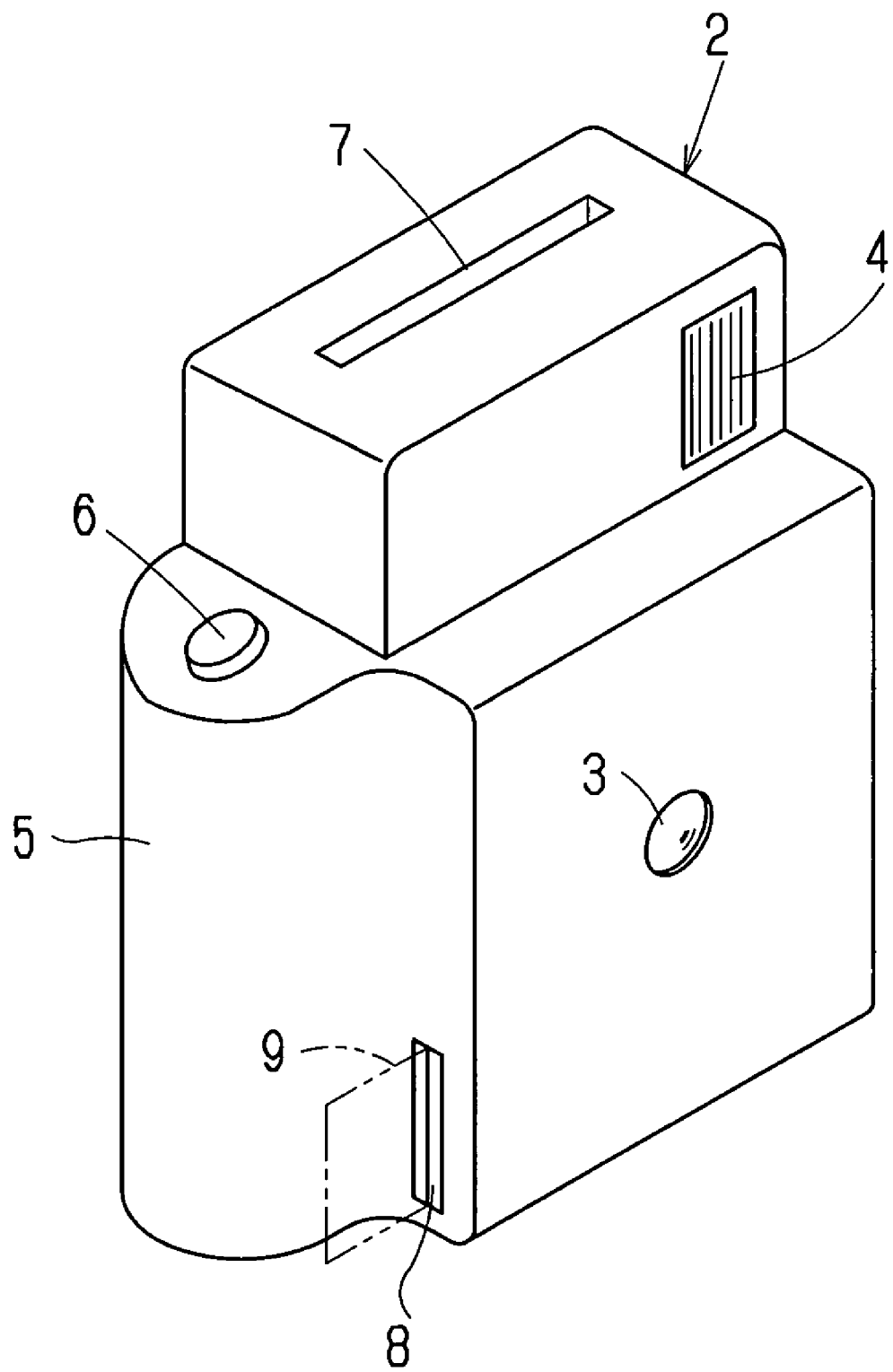
FIG. 1 is a front perspective view illustrating an electronic still camera incorporated with printer, according to a first embodiment of the present invention.
Figure 2:
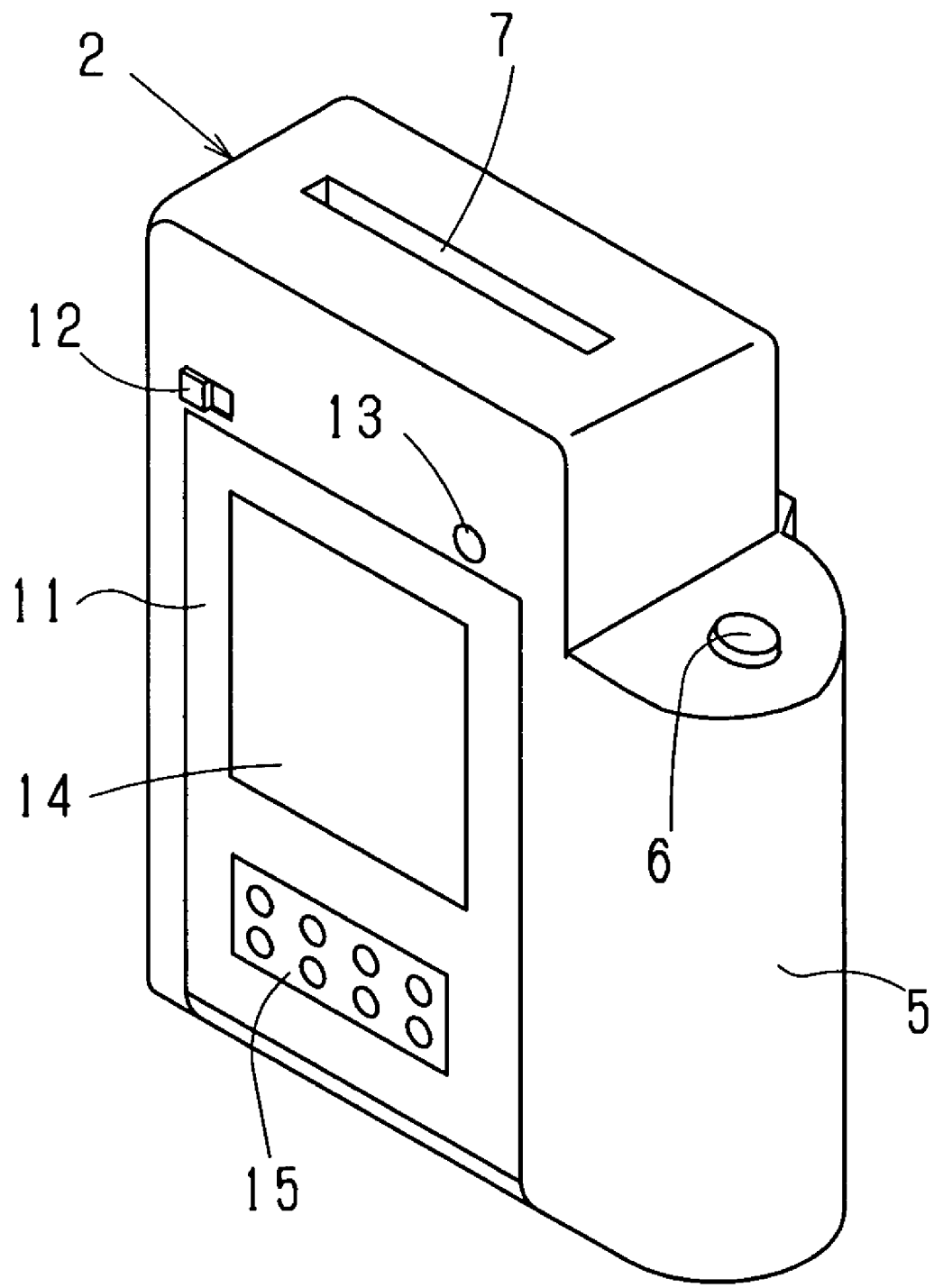
FIG. 2 is a rear perspective view illustrating the electronic still camera of FIG. 1.

In the electronic still camera shown in FIGS. 1 and 2, a taking lens 3 and a flash projector 4 are provided on a front side of a camera body 2. A shutter button 6 is provided on a top side of a grip portion 5. Upon the shutter button 6 being pressed, image data of a subject photographed through the taking lens 3 is picked up as a frame of still image. An ejection slit 7 is formed through a top wall of the camera body 2. When a printing operation is made, an exposed instant film is ejected from the ejection slit 7.

A slot 8 for loading a memory card 9 as an external memory medium is formed through a side wall of the camera body 2 beside the grip 5. While the memory card 9 is in the memory slot 8, the electronic still camera can read and write data from and on the memory card 9.

As shown in FIG. 2, a knob 12 is formed on a back side of the camera body 2, for opening and closing a pack loading door 11 of a pack loading chamber 10. The pack loading door 11 is usually locked in a closed position by the knob 12, and is opened by operating the knob 12, for loading or unloading a film pack into or out of the pack loading chamber 10. A counter window 13 displays the number of used instant films.

An LCD (liquid crystal display) panel 14 is incorporated into the pack loading door 11. The LCD panel 14 constitutes an electronic viewfinder that displays images of subjects as being photographed through the taking lens 3 in a real time fashion. A console 15 is provided below the LCD panel 14. By operating keys of the console 15, it is possible to choose between an imaging mode and a reproduction mode, select images in the reproduction mode, enter a print command, delete image data and carry out other operations.

Figure 4A:
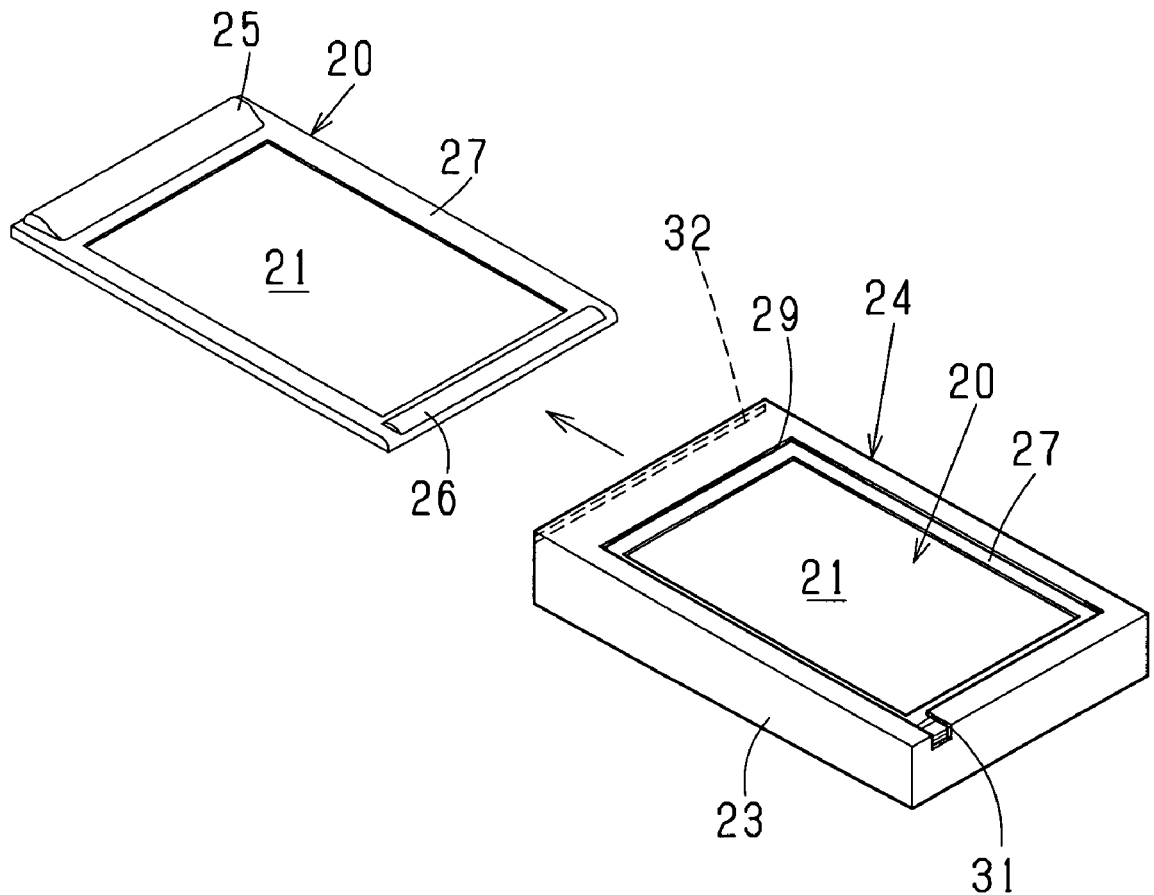
FIG. 4A is a perspective view illustrating an instant film and a film pack.
Figure 4B:
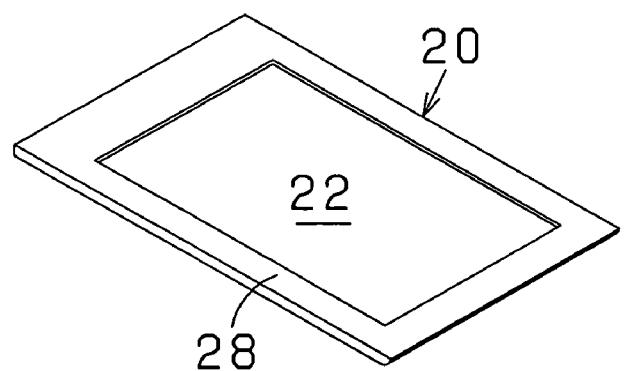
FIG. 4B is a perspective view illustrating an opposite side of the instant film of FIG. 4A.

An instant film 20 and a film pack 24 for use in the above electronic still camera are shown in FIG. 4A. The opposite side of the instant film 20 is also shown in FIG. 4B. The instant film 20 is a well-known mono-sheet type, wherein light is applied to an exposure area 21 on a photosensitive surface side that is shown in FIG. 4A, and a developed color positive image is shown in a display area 22 on a display surface side that is shown in FIG. 4B. The film pack 24 contains a stack of sheets of these instant films 20 in a plastic case 23.

On the photosensitive surface side, along opposite ends of the instant film 20 in an advancing direction from the case 23, there are provided a processing fluid pod 25 containing processing fluid, and a surplus fluid accepting portion 26 for accepting a remainder of the processing fluid. On a surface of an image receiving photosensitive layer protecting sheet, a photosensitive side frame 27 is provided for defining position and size of the exposure area 21 on the instant film 20. A displaying side frame 28 is provided on a surface of an image transferred layer protection sheet. A display area 22 is defined by the display side frame 28, such that the display area 22 is located inside the exposure area 21, and sized a little smaller than the exposure area 21.

Figure 3:
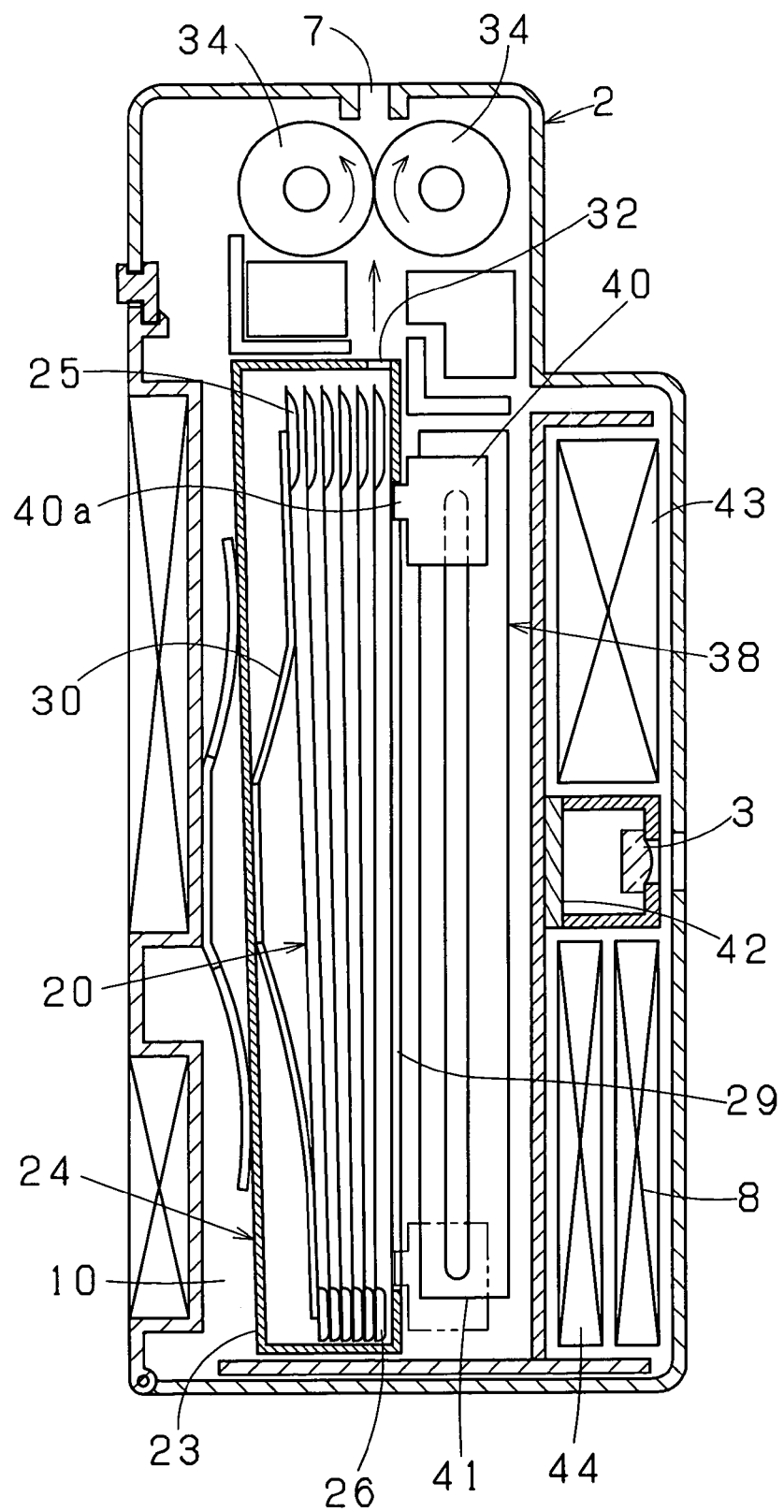
FIG. 3 is a schematic vertical section illustrating the electronic still camera of FIG. 1.

The case 23 of the film pack 24 has an exposure opening 29, to which the photosensitive surface of the instant film 20 is opposed, and which is larger than the exposure area 21. As shown in FIG. 3, a spring member 30 is provided inside the case 23 on the opposite side from the exposure opening 29. The spring member 30 urges the stacked instant films 20 toward the exposure opening 29, thereby to maintain the uppermost one of the instant films 20 in a flat plane. The case 23 also has a cutout 31 in an end portion that is on the side of the surplus fluid accepting portion 26 of the contained instant films 20, and an outlet 32 in a portion on the side of the processing fluid pod 25.

In an instant camera, the exposure area 21 is exposed at once through the exposure opening 29. However, in the present electronic still camera, the instant film 20 is exposed line after line to printing light from a printing head 40. A pair of spread rollers 34 are located between the outlet 32 of the film pack 24 and the ejection slit 7 of the camera body 2. After each exposure, a claw member of an advancing claw mechanism 36 is inserted into the case 23 through the cutout 31, to advance the exposed instant film 20 out of the outlet 32 into between the spread rollers 34. Then, rotation of the spread rollers 34 causes the instant film 20 to advance through the ejection slit 7 to outside the camera body 2.

In front of the pack loading chamber 10 is disposed an exposure unit 38 as an exposure device of the instant printer section. The exposure unit 38 is constituted of the printing head 40, and a scanning mechanism for moving the printing head 40 in a sub scan direction (vertical direction in FIG. 3) that is parallel to the film feed out direction. An image sensor, e.g. CCD image sensor 42, is located in front of the exposure unit 38 but behind the taking lens 3. An optical system including the taking lens 3 is of a pan-focus type, so it is possible to photograph a subject within a depth of field of the optical system without the need for focusing. But it is of course possible to provide an automatic focusing device to carry out focusing by shifting the taking lens 3 in accordance with a subject distance a timing when the shutter button 6 being pressed. In that case, a light projection window and a light receiving window are provided on the front side of the camera body, for measuring subject distance in a trigonometric method.

Above the taking lens 3 and the CCD image sensor 42 is mounted an imaging circuit unit 43. The imaging circuit unit 43, the taking lens 3 and the CCD image sensor 42 constitute an imaging device. Below the taking lens 3 and the CCD image sensor 42 are disposed a printing circuit unit 44 and the memory slot 8. The printing circuit unit 44 and the exposure unit 38 constitute the instant printer section.

Figure 5:
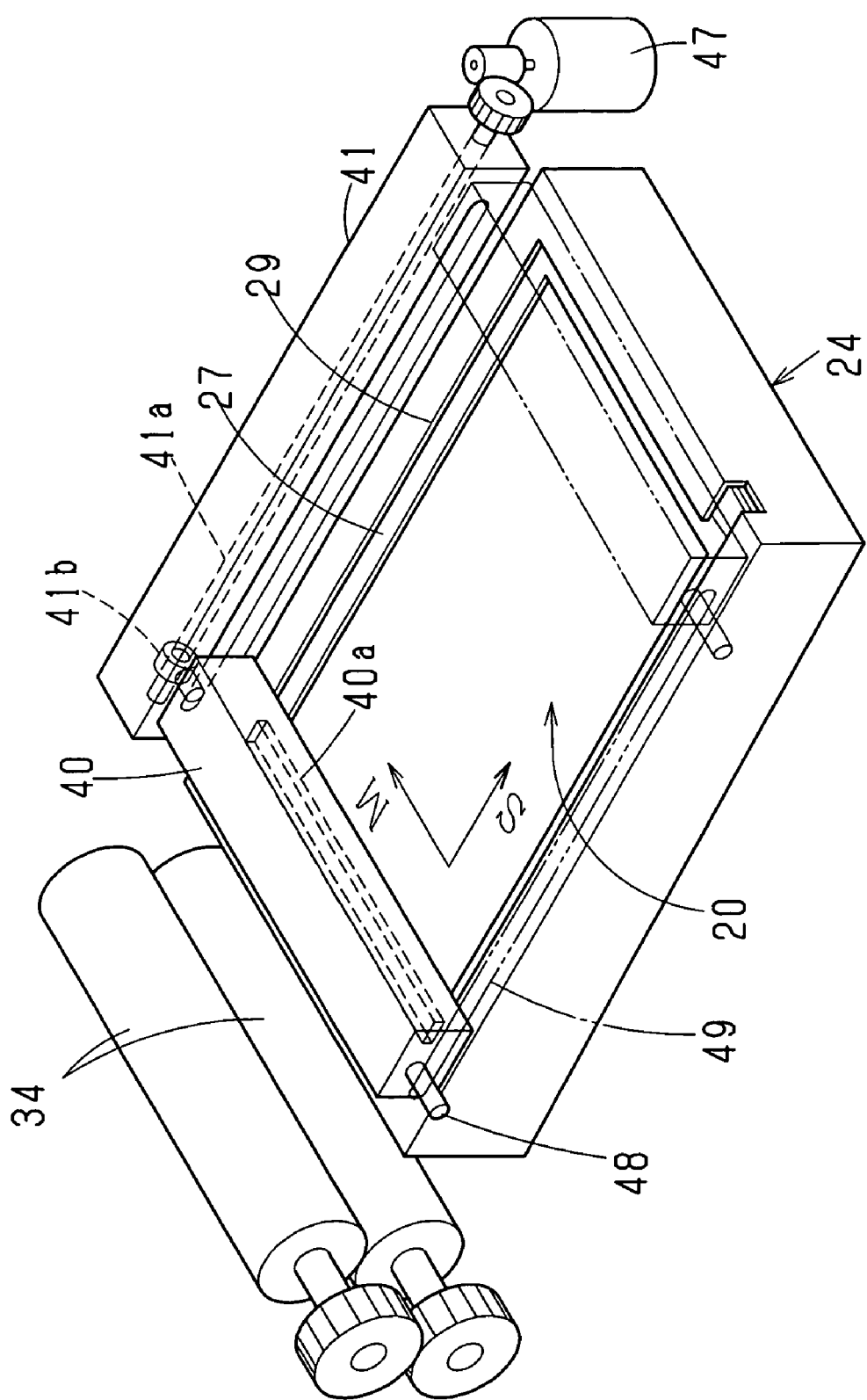
FIG. 5 is a perspective view illustrating an instant printer section of the electronic still camera of FIG. 1.

FIG. 5 shows an appearance of the instant printer section. The printing head 40 extends along a main scan direction M that is perpendicular to the sub scan direction S. A protruded portion 40a is formed on one side of the printing head 40 that faces the film pack 24, and is provided with a light projection slit 46 (illustrated in FIG. 6) for projecting printing light onto the photosensitive surface of the instant film 20. As shown in FIG. 3, the printing head 40 is disposed such that the protruded portion 40a is inserted in the exposure opening 29 of the case 23, to oppose the light projecting slit 46 to the instant film 20. Placing the printing head 40 in the exposure opening 29 reduces the amount of protrusion of the printing head 40 in a vertical direction to the surface of the instant film 20, and thus improves the space efficiency inside the camera body 2. Also the printing light is projected onto the instant film 20 without leakage.

The scanning mechanism 41 includes a lead screw 41a that extends in the sub scan direction S, a scanning motor 47 for rotating the lead screw 41a, and a shift member 41b that is moved in an axial direction of the lead screw 41a (the sub scan direction S) by rotating the lead screw 41a. To the shift member 41b is secured one end of the printing head 40. Thus, the printing head 40 moves with the shift member 41b along the sub scan direction S when the lead screw 41a rotates with the scanning motor 47.

The scanning motor 47 may rotate in forward and rearward directions. When the scanning motor 47 rotates forward, the printing head 47 moves toward the spread rollers 34, i.e. from a scanning start position on the side of the processing fluid pod 25 of the instant film 20 toward the surplus fluid accepting portion 26. When the printing head 40 moves to a scanning end position shown by phantom lines, a sub scanning step is accomplished. A guide pin 48 is provided on the opposite end of the printing head 40 from the shift member 41b. The guide pin 48 is engaged in a guide groove 49, so the printing head 40 would not be slanted during the movement. While the scanning mechanism 41 is moving the printing head 40 in the sub scan direction, printing light beams of three colors are concurrently projected onto the exposure area 21 of the instant film 20 to record a color image line by line. When the exposure is completed, the scanning motor 47 is rotated rearward to return the printing head 40 to the scanning start position shown by solid lines.

Figure 6:
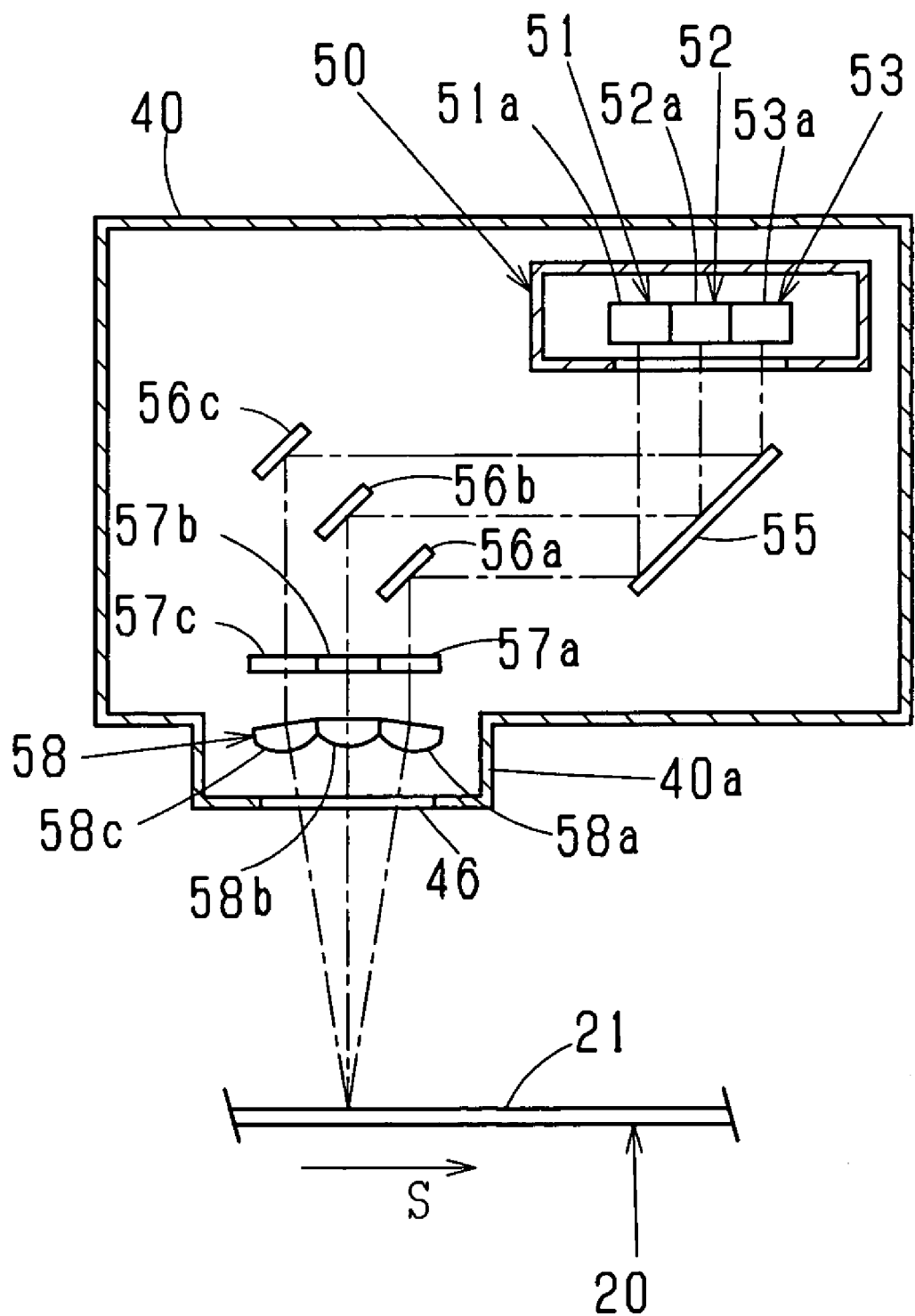
FIG. 6 is a sectional view illustrating an example of printing head.

As shown in FIG. 6, the printing head 40 contains a light emission array unit 50 consisting of a light emitting element array 51 for red, a light emitting element array 52 for green, and a light emitting element array 53 for blue. Each of the three light emitting element arrays 51 to 53 is constituted of a large number of light emitting elements 51a to 53a which are arranged in a row in the main scan direction M, and the three arrays 51 to 53 are arranged in rows in the sub scan direction. To recording a line, light emission times of the light emitting elements 51a to 53a are each individually controlled in accordance with image data of corresponding colors, but all of the light emitting elements 51a to 53a emit white light. LEDs are used as the light emitting elements 51a to 53a in this embodiment, but another kind of light emitting elements are usable insofar as they emit light containing three color components of red, green and blue.

Light beams from the light emitting elements 51a of the light emitting element array 51 for red are deflected by mirrors 55 and 56a that are provided outside the light emission array unit 50. In the deflected light paths is disposed a red-pass filter 57a, through which the light beams are turned to red printing light beams. In the same way, light beams from the light emitting elements 52a of the light emitting element array 52 for green are deflected by the mirror 55 and a mirror 56b, and are turned to green printing light beams through a green-pass filter 57b that is disposed in the light paths of these light beams. Light beams from the light emitting elements 53a of the light emitting element array 53 for blue are turned to blue printing light beams through a blue-pass filter 57c, after being deflected by the mirror 55 and a mirror 56c.

In light paths of the printing light beams of the respective colors is disposed a micro lens array 58 that is constituted of focusing lenses 58a, 58b and 58c for red, green and blue, which are arranged in correspondence with the light emitting elements 51a to 53a of the light emitting element array 51 to 53. The red printing light beams are focused by the focusing lenses 58a for red of the micro lens array 58 onto the photosensitive surface in the exposure area 21 of the instant film 20 via the light projection slit 46. In the same way, the green printing light beams and the blue printing light beams are projected onto the instant film 20 through the focusing lenses 58b for green and the focusing lenses 58c for blue, respectively.

Incident surfaces of the focusing lenses 58a and 58c for red and blue have a function of prism, and are inclined such that their optical axes come across optical axes of the focusing lenses 58b for green. Thus the three-color printing light beams from those three of the light emitting elements 51a to 53a which are aligned in the sub scan direction S, are projected onto a point on the instant film 20. Consequently, the photosensitive surface is exposed to the three-color printing light beams that are aligned in a line along the main scan direction M, so a large number of three-color pixels aligned in a line along the main scan direction M are recorded on the instant film 20.

Figure 7:
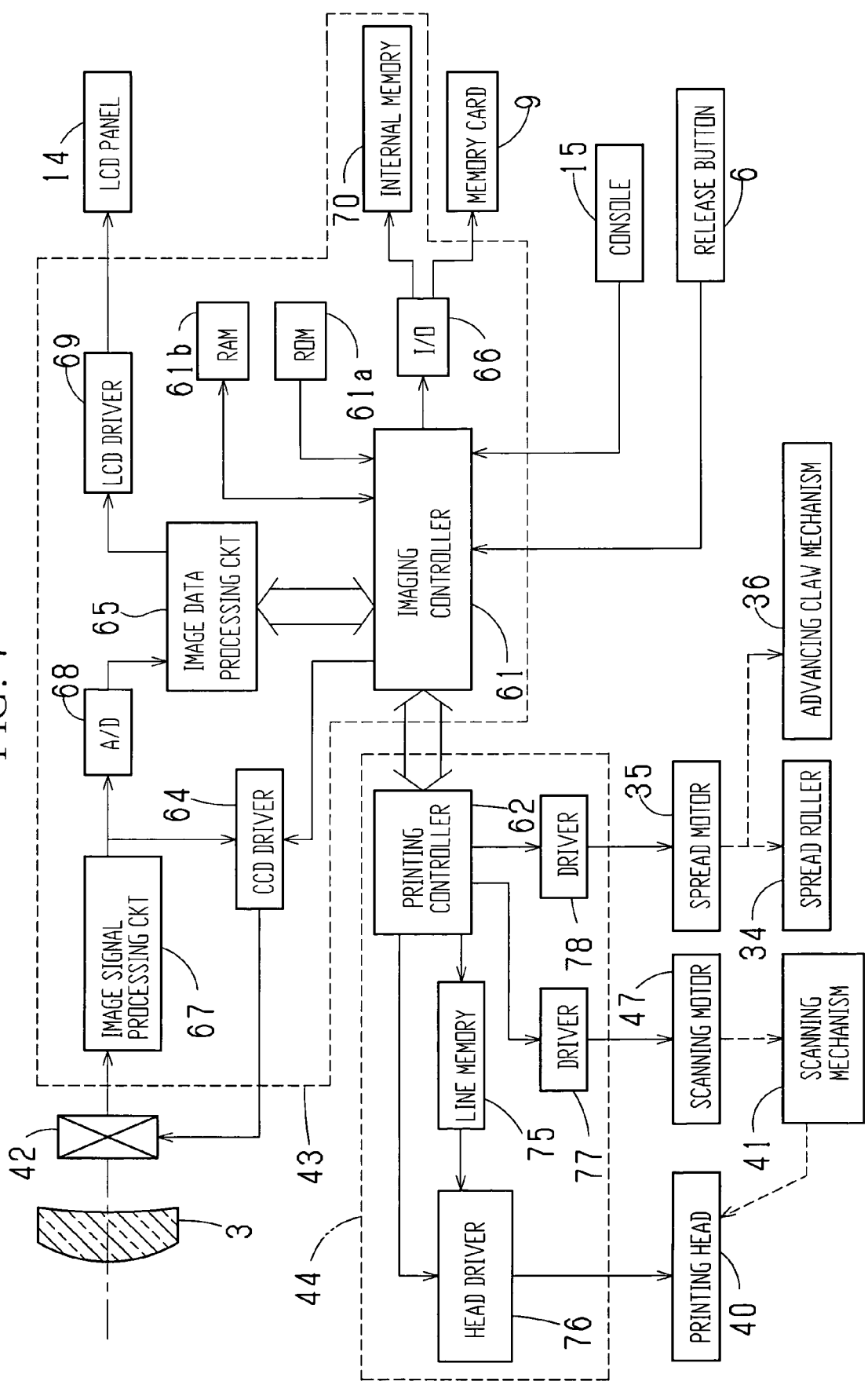
FIG. 7 is a block diagram illustrating the circuitry of the electronic still camera of FIG. 1.

FIG. 7 shows the circuitry of the above described electronic still camera. The operation of the electronic still camera is controlled by an imaging controller 61 of the imaging circuit unit 43 and a printing controller 62 of the printing circuit unit 44. The imaging controller 61 controls sequential operations necessary for imaging in accordance with a sequence program written in ROM 61a. The printing controller 62 exchanges data with the imaging controller 61, and controls sequential operations from exposure to ejection of the instant film 20 in accordance with a sequence program written in the ROM 61a. RAM 61b is used as a work memory that temporarily stores necessary data for the control or other data.

The imaging controller 61 controls a CCD driver 64, an image data processing circuit 65 and an I/O control circuit 66 of the imaging circuit unit 43. The CCD driver 64 drives the CCD image sensor 42, and charge-storage time of the CCD image sensor 42 is controlled automatically in accordance with subject brightness fed back from the image signal processing circuit 67.

The image signal from the CCD image sensor 42 is fed to the image signal processing circuit 67. The image signal processing circuit 67 amplifies the image signal to an appropriate level by using an automatic gain controller or the like and, thereafter, subjects it to three-color separation. The image signal of each color is converted into a digital form through an A/D converter 68, and then fed to the image data processing circuit 65. The image data processing circuit 65 produces image data of red, green and blue by making image processing steps, including white-balance control, gamma-correction, and matrix operation. The image data of one frame is successively sent from the image data processing circuit 65 to an LCD driver 69, so the LCD panel 14 displays moving finder images.

When the shutter button 6 is operated, image data of one frame obtained at that moment is written in an internal memory 70 through the imaging controller 61 and the I/O control circuit 66. For example, the internal memory 70 can store image data of 50 frames of still images. The image data stored in this way may be written on the memory card 9 through the I/O control circuit 66, that is removably inserted in the memory slot 8.

When a print command is entered through the console 15, the imaging controller 61 reads respective color image data of one frame from the internal memory 70 or the memory card 9 through the I/O control circuit 66, and sends it to the printing controller 62. Simultaneously, the imaging controller 61 sends a print start command to the printing controller 62. The internal memory 70 is designed to keep the written image data based on a backup battery, separately from a power source of the electronic still camera, so the image data in the internal memory 70 will not vanish even when a power switch of the electronic still camera is turned off.

The printing controller 62 controls the respective elements of the printing circuit unit 44. The printing controller 62 writes the image data of each of one line in a line memory 75. The image data written in the line memory 75 is read out into a head driver 76. The head driver 76 produces drive pulses from the image data of each color of one line, the drive pulses being used for controlling emission time of each light emitting element 51a to 53a. The head driver 76 produces the drive pulses, taking account of spectral sensitivity of the instant film 20, emission characteristics of the respective light emitting elements 51a to 53a, transparencies of the respective filters 57a to 57c and so forth. The drive pulses for three colors of one line are sent to the printing head 40, so the corresponding light emitting elements 51a to 53a of the printing head 40 emit light while the drive pulses are applied thereto.

The printing controller 62 rotates the scanning motor 47 in both directions through a driver 77. Rotational movement of the scanning motor 47 is transmitted to the scanning mechanism 41 as set force above, causing the printing head 40 to move in the sub scan direction. A driver 78 drives a spreading motor 35 after the printing head 40 complete exposure. Rotational movement of the spreading motor 35 is transmitted to the spreading rollers 34, causing them to rotate. The rotational movement of the spreading motor 35 is also transmitted to the advancing claw mechanism 36, so the claw member of the advancing claw mechanism 36 is driven once immediately after the spreading motor 35 starts rotating.

Figure 8:
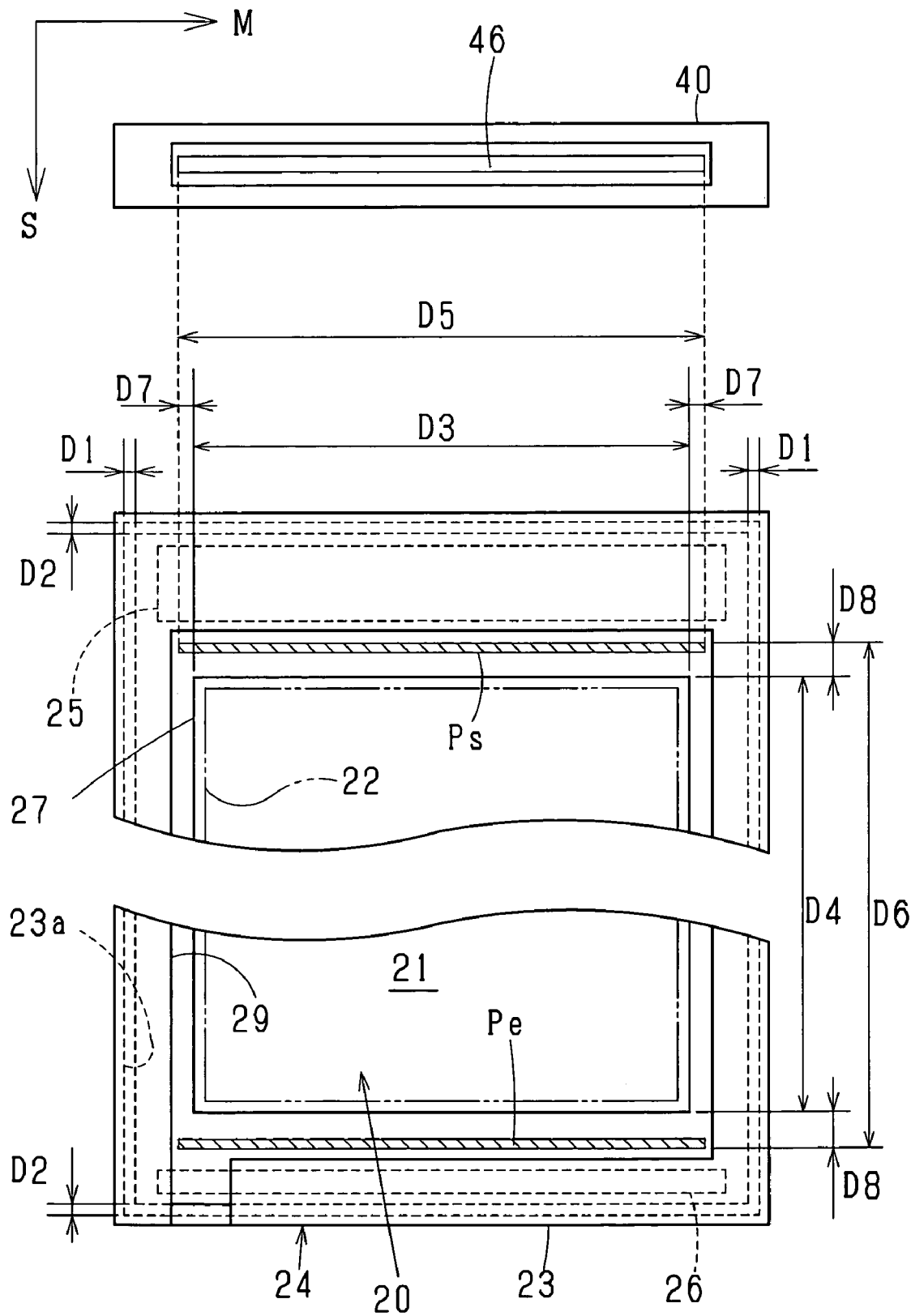
FIG. 8 is an explanatory diagram illustrating a relationship between an illumination range of the printing light and an exposure area on an instant film in the instant printer section of FIG. 5.

FIG. 8 shows the relationship between the exposure area 21 of the instant film 20 and an illumination range that is illuminated by the printing light beams from the printing head 40, and a relationship between the size of the case 23 and the size of the instant film 20. FIG. 8 shows a position where the instant film 20 does not deviate from a normal position.

For smooth transportation of the instant film 20, there are provided clearances between the instant films 20 and internal walls 23a of the case 23 in the main and sub scan directions M and S. The clearance from either marginal edge of the instant films 20 in the main scan direction has a length D1, and the clearance from either marginal edge in the sub scan direction has a length D2. The exposure area 21 defined by the photosensitive side frame 27 on the photosensitive side has a length D3 in the main scan direction M and a length D4 in the sub scan direction S.

The printing head 40 has the light emitting elements 51a to 53a and the focusing lenses 58a to 58c of a larger number than necessary for exposing only the exposure area 21 with respect to the main scan direction, so a length D5 in the main scan direction of the line of the printing light beams as projected from the light projection slit 46, i.e., the length D5 in the main scan direction of the illumination range, is longer than the length D3 in the main scan direction of the exposure area 21.

When the printing head 40 starts projecting the printing light for the first line at the scanning start position, the printing light is projected onto a line exposure start position Ps that is shifted from the exposure area 21 toward the processing fluid pod 25. When the printing head 40 concludes exposure by projecting printing light for the last line at the scanning end position, the printing light is projected onto a line exposure end position Pe that is shifted from the exposure area 21 toward the surplus fluid accepting portion 26. In this way, the illumination range of the printing light has a length D6 in the sub scan direction S that is longer than the length D4 in the sub scan direction of the exposure area 21.

More specifically, the illumination range is elongated in the main scan direction by the length D7 from either marginal edge of the exposure area 21 of the instant film 20 as set in the normal position. The length D7 is determined to be not less than the clearance D1 in the main scan direction between the instant film 20 and the internal wall 23a of the case 23. Accordingly, if the instant film 20 deviates from the normal position in the main scan direction M, e.g. to the right in the drawings, at most by the length D1, the printing light is projected from end to end of the exposure area 21 in the main scan direction.

The illumination range is also elongated in the sub scan direction by the length D8 from either marginal edge of the exposure area 21 of the instant film 20 as set in the normal position. The length D8 is determined to be not less than the clearance D2 in the sub scan direction S between the instant film 20 and the internal wall 23a of the case 23. Thereby, if the instant film 20 deviates from the normal position in the sub scan direction S, e.g. upward in the drawings, at most by the length D2, the printing light is projected from end to end of the exposure area 21 in the sub scan direction.

In this way, the illumination range of the printing light from the printing head 40 is made wider than the exposure range 21, so the printing light is projected onto the entire exposure area 21 even where the instant films 20 deviate in the main or the sub scan direction. Needless to say, the exposure opening 29 of the case 23 is sized to be larger than the illumination range of the printing head 40 in the main scan direction as well as in the sub scan direction. Since the display area 22 is made smaller than the exposure area 21 in this instant film 20, as shown by phantom lines, it is possible to determine the size of the illumination range on the basis of the display area 22, regarding the display area 22 as a substantial image forming area.

Next, the operation of the electronic still camera having the above described configurations will be described.

Before the film pack 24 being used, a light-shielding sheet for closing the exposure opening 29 is stacked with the instant films 20 in the case 23. Therefore, when the pack loading door 11 is closed after the film pack 24 is loaded in the pack loading chamber 10, the spreading motor 35 is automatically driven to cause the advancing claw mechanism 36 and the spreading rollers 34 to eject the light-shielding sheet from the case 23 to the outside of the camera body 2 through the ejection slit 7.

After a main switch, that is provided in the console 15, is turned on, either the imaging mode or the reproduction mode is chosen by operating a mode switching key of the console 15. When the imaging mode is chosen, images of subjects are successively photographed through the CCD image sensor 42, and are displayed as moving images on the LCD panel 14, in the same way as in conventional electronic still cameras. A subject is framed while monitoring the images displayed on the LCD panel 14. Thereafter when the shutter button 6 is operated, image data of the subject displayed on the LCD panel 14 at that timing is written in the internal memory 70. When it is determined based on the level of the signal from the image signal processing circuit 67, that the subject brightness is less than a predetermined level, the flash projector 4 is automatically activated to flash in synchronization with the operation on the shutter button 6.

In the reproduction mode, by keying the console 15, it is possible to send image data of an appropriate image stored in the internal memory 70 or the memory card 9 to the LCD driver 69 via the I/O control circuit 66, the imaging controller 61, the image data processing circuit 65, thereby to display it as a still image on the LCD panel 14. To print a still image displayed on the LCD panel 14, a print command is entered through the console 15. Then, the imaging controller 61 sends the print command to the printing controller 62, and thereafter accesses the internal memory 70 or the memory card 9 through the I/O control circuit 66, to read out image data of three colors of the image displayed on the LCD panel 14 sequentially from the first line and send it to the printing controller 62.

In response to the print command from the imaging controller 61, the printing controller 62 controls the printing circuit unit 44 to start printing. The printing controller 62 also transfers the respective color image data of the first line from the imaging controller 61 to the line memory 75.

The head driver 76 produces driving pulses of three colors from the three color image data of the first line written in the line memory 75, and drives the light emitting elements 51a to 53a of the light emitting element arrays 51 to 53 for the respective colors of the printing head 40.

Light beams from the respective light emitting elements 51a to 53a are converted into printing light beams of three colors, and then projected toward the instant film 20 through the light projection slit 46. Because the printing head 40 is in the scanning start position at that time, the three-color printing light beams are projected onto a portion of the instant film 20 that is located at the line exposure start position Ps inside the exposure opening 29. With respect to the main scan direction, the printing light beams are projected over a wider range than the exposure area 21 of the instant film 20 if it is located in the normal position.

During the exposure of the first line, three color image data of the second line is written in the line memory 75. After the exposure of the first line is completed, the driver 77 causes the scanning motor 47 to rotate forward through a predetermined angle, shifting the printing head 40 by one line in the sub scan direction. After the printing head 40 moves by one line, the head driver 76 produces drive pulses from the three-color image data written in the line memory 75, and drives the printing head 40 with these drive pulses. Thereby, three-color printing light beams for the second line are projected onto the instant film 20.

Thereafter, in the same way as above, while being shifted in the sub scan direction, the printing head 40 is driven by drive pulses which are produced from three-color image data of the third and following lines, to project three-color printing light beams for the third and following lines onto the instant film 20. When the printing head 40 accomplishes exposure of the last line at the scanning end position, an exposure sequence for an image is completed. The three-color printing light beams for the last line are projected onto a portion of the instant film 20 that is located at the exposure end position Pe inside the exposure opening 29.

In this way, taking account of the clearances between the case 23 and the instant film 20, printing light beams are projected over a range that extends beyond the exposure area 21 of the film unit 20 as it is placed in the normal position, in the main and sub scan directions. Accordingly, even if the instant film 20 deviates in the main or the sub scan direction inside the case 23, the entire exposure area is included in the illumination range, and thus exposed to the printing light beams.

After the exposure of the last line, the scanning motor 47 is continuously rotated rearward, to return the printing head 40 from the scanning end position to the scanning start position. During the returning movement, when the printing head 40 moves to a position where it does not hinder the movement of the claw member, the spread motor 35 is driven to start rotating the spread roller pair 34. The rotational movement of the spread motor 35 is transmitted to the advancing claw mechanism 36, so the advancing claw mechanism 36 inserts the claw member into the case 23 through the cutout 31, to push the instant film 20 out of the outlet 32 toward the spread rollers 34. Thereby, the exposed instant film 20 is fed in between the spread rollers 34, and is ejected through the ejection slit 7 of the camera body 2 by the rotating spread rollers 34. At that time, the processing fluid pod 25 is ruptured by the spreading rollers 34, so the processing fluid is spread between the image receiving photosensitive layer and the image transferred layer, while these layers are being pressed onto each other. A remainder of the processing fluid is accepted in the surplus fluid accepting portion 26.

In one or a couple of minutes after the instant film 20 is ejected through the ejection slit 7, the image photographed as a latent image on the image receiving photosensitive layer is transferred as a color positive image to the image transferred layer, and is fixed on the image transferred layer. The color image appears in the display area 22 of the instant film 20. As set forth above, since the entire exposure area 21 is exposed even if the instant film 20 deviates during the exposure, the color image is shown over the entire display area 22, without the problem of having unexposed portions that are colored black.

In the above embodiment, the CCD image sensor 42 has a photographic field that corresponds to the illumination range of the printing head 40. That is, drive pulses for driving the printing head 40 are produced from image data of one frame obtained through the CCD image sensor 42. It is alternatively possible to obtain image data by photographing a field corresponding to the exposure area 21, and subject the image data of each frame to an image enlargement process, for forming a frame of printing image data, from which drive pulses for the printing head 40 are produced.

The printing head of the above embodiment uses light emitting elements that emit white light, for obtaining three-color printing light beams, and makes exposure to the three color light beams concurrently on the same line. However, the printing head may have another configuration. Examples of other configurations of the printing head will be described with respect to FIGS. 9 to 12. In the following descriptions, those elements which are substantially equivalent to those used in the above embodiment are designated by the same reference numbers as in the above embodiment, so the description of these elements are omitted.

Figure 9:
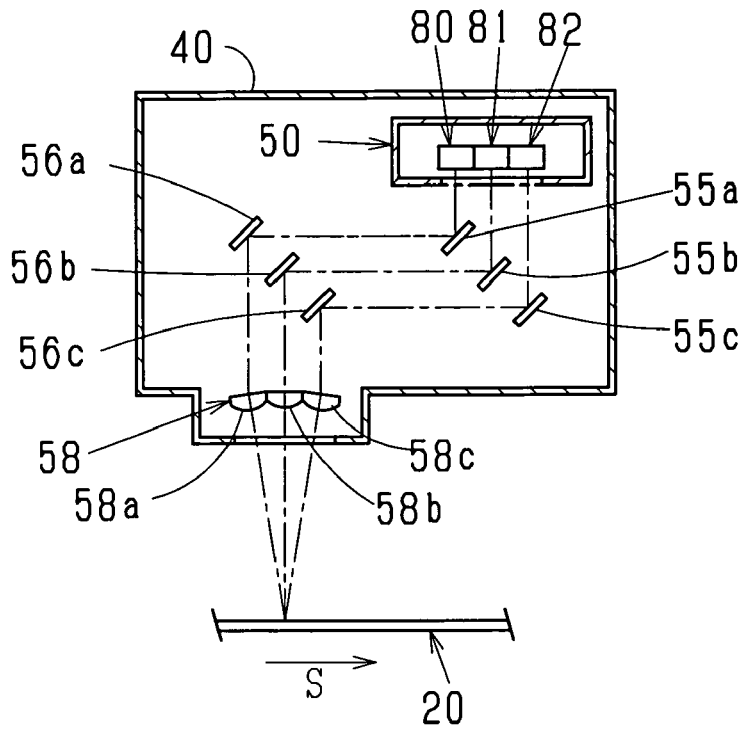
FIG. 9 is a sectional view of another printing head using light emission array unit that projects printing light of three colors.

In a printing head 40 shown in FIG. 9, a light emission array unit 50 is constituted of light emission arrays 80 to 82 for red, green and blue, each of which consists of a plurality of light emitting elements that respectively project red, green and blue light beams, so the light emission array unit 50 directly emits three-color printing light beams. The light beams from the light emission array 80 to 82 are directed to an lens array 58 through a pair of mirrors 55a, 55b, 55c and 56a, 56b, 56c, for each color.

Figure 10:
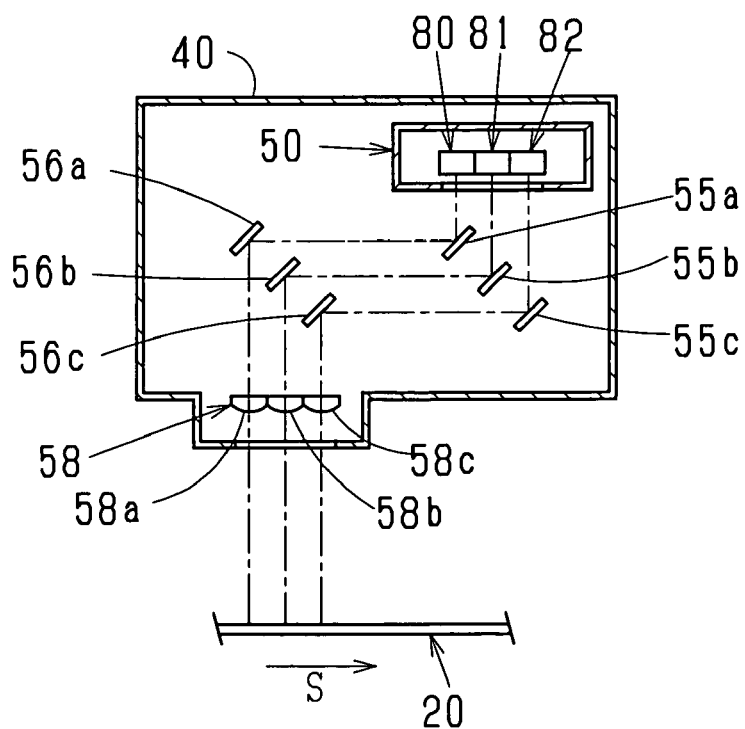
FIG. 10 is a sectional view of still another printing head using light emission array unit that projects printing light of three colors.

A printing head 40 shown in FIG. 10 has a light emission array 50 that is configured to be equal to that shown in FIG. 9, but optical axes of focusing lenses 58a to 58c of a lens array 58 are not inclined but extend parallel to each other. Thereby, the instant film 20 is concurrently exposed to three lines of three color printing light beams, one line for one color. In another example shown in FIG. 11, a light emission array unit 50 is constituted of three rows of light emission arrays 51 to 53 that project white light, and three color filters 57a to 57c are used for producing three-color printing light beams, like the embodiment of FIG. 7. However, the three-color printing light beams are projected along three lines.

Figure 11:
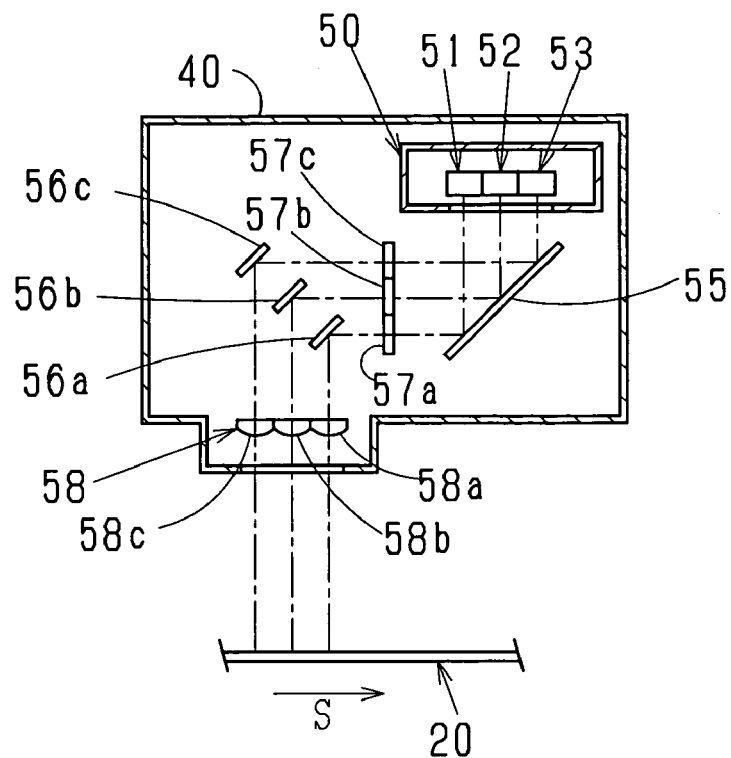
FIG. 11 is a sectional view of a printing head that uses three color filters for obtaining printing light of three colors for exposure.

In any of the above examples shown in FIGS. 9 to 11, a full-color image is printed during a single movement of the printing head 40 in the sub scan direction. Since the three colors are concurrently projected, it is possible to make the sub scanning by advancing the instant film 20 out of the camera body 2 through the spread rollers 33, instead of making the sub scanning by moving the printing head 40 in the sub scan direction S. Where the printing head 40 is configured as shown in FIG. 10 or FIG. 11, the concurrently projected printing light beams have a width in the sub scan direction that corresponds to three lines. Therefore, the printing light beams of all the three lines should be projected over a wider range than the exposure area in the sub scan direction, in view of the deviation due to the clearances.

The micro lens array 58 is constituted of a large number of micro lenses that are arranged in correspondence with the light emission array 50. Instead of the micro lenses, micro cylindrical lenses made of graded index type optical fibers, called SELFOC lens (a trade name), may be used.

Figure 12:
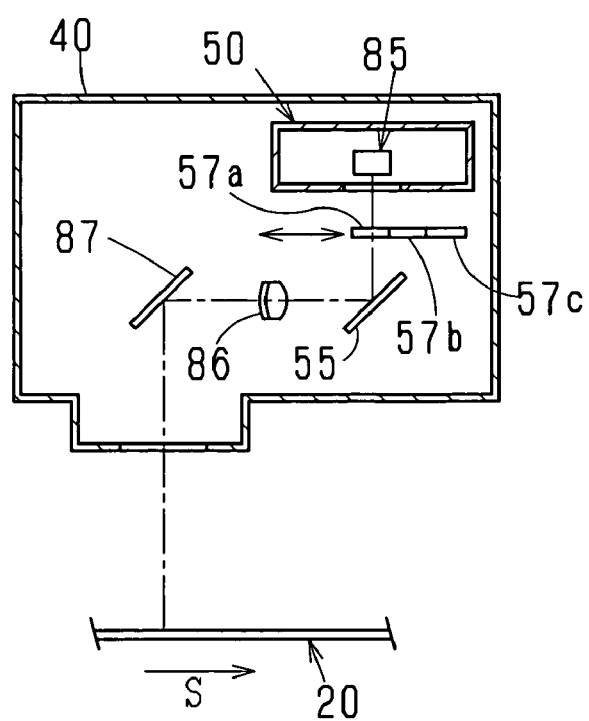
FIG. 12 is a sectional view of a printing head that makes exposure in a three-color frame sequential fashion by switching three color filters.

A printing head 40 shown in FIG. 12 uses a light emitting element array 85 consisting of a large number of white light emitting elements arranged in a line, and red, green and blue filters 57a to 57c. In this embodiment, printing light beams are focused on the instant film 20 through a micro lens array 86 that is placed between mirror 55 and 87. The micro lens array 86 consists of SELFOC lenses or another kind of micro lenses, and prevents the printing light beam for each pixel from diffusing into other pixel positions. In this instance, the three color filters 57a to 57c are switched to each other upon the printing head 40 being moved once in the sub scan direction, so that a full-color image is printed in a three-color frame sequential fashion. In this case, it is unnecessary to return the printing head 40 to the scanning start position. Instead, red pixels are recorded by red printing light beams while the printing head 40 moves from the scanning start position to the scanning end position, and green pixels are recorded by green printing light beams while the printing head 40 moves from the scanning start position to the scanning end position. And then, blue pixels are recorded by blue printing light beams while the printing head 40 moves from the scanning start position to the scanning end position. In the three-color frame sequential printing, sub scanning for the last color may be carried out by moving the instant film 20 while holding the printing head 40 stationary.

Figure 13:
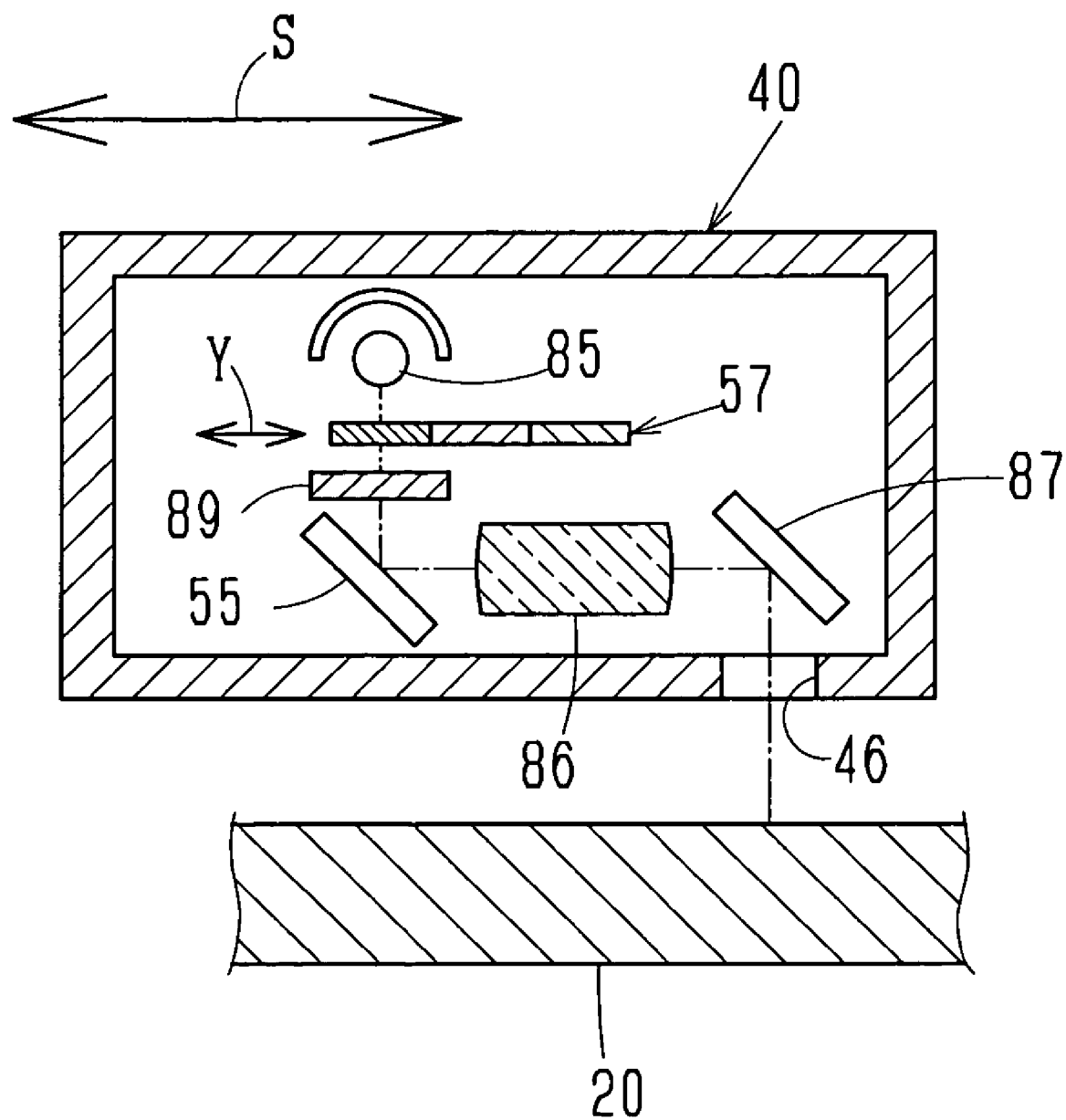
FIG. 13 is a sectional view of another printing head that makes exposure in a three-color frame sequential fashion by switching three color filters.

Although the amount of exposure of the instant film is controlled by changing lighting times of the light emitting elements in the above embodiment, it is possible to drive the light emitting elements continuously, and direct light from each light emitting element to an LCD panel, such that the amount of light that passes through the LCD panel, i.e. the amount of printing light, may be controlled by controlling transparency of the LCD panel. This configuration makes it possible to use a fluorescent lamp and color filters as a light source, instead of the light emitting element arrays, for obtaining three-color printing light. FIG. 13 shows an example of such a printing head.

In FIG. 13, a fluorescent lamp 85 is elongated along a lengthwise direction of a printing head 40, i.e., along the main scan direction. Illumination light from the fluorescent lamp 85 contains red (R), green (G) and blue (B). It is possible to use another kind of light source insofar as its light contains these colors. A color filter 57 is placed in an illumination light path from the fluorescent lamp 85. The color filter 57 has a red-pass filter portion, a green-pass filter portion and a blue-pass filter portion, which extend along the length of the lamp 85, and are arranged side by side in a perpendicular direction Y to the lamp, i.e. in the sub scan direction S. One of these three filter portions is placed in the illumination light path of the fluorescent lamp 85 by shifting the color filter 57 in the direction Y in response to a filter switching signal.

As passing through the color filter 85, the illumination light from the fluorescent lamp 85 comes to be red, green or blue printing light. The printing light travels through a liquid crystal array 89, a mirror 55, a micro lens array 86 and a mirror 87, and is projected onto the instant film 20 through a light projection slit 46. The liquid crystal array 89 consists of micro liquid crystal segments arranged in a line, wherein each liquid crystal segment corresponds to one pixel on print. The liquid crystal array 89 controls printing densities by blocking printing light or controlling light-permeability at each liquid crystal segment.

Figure 14:
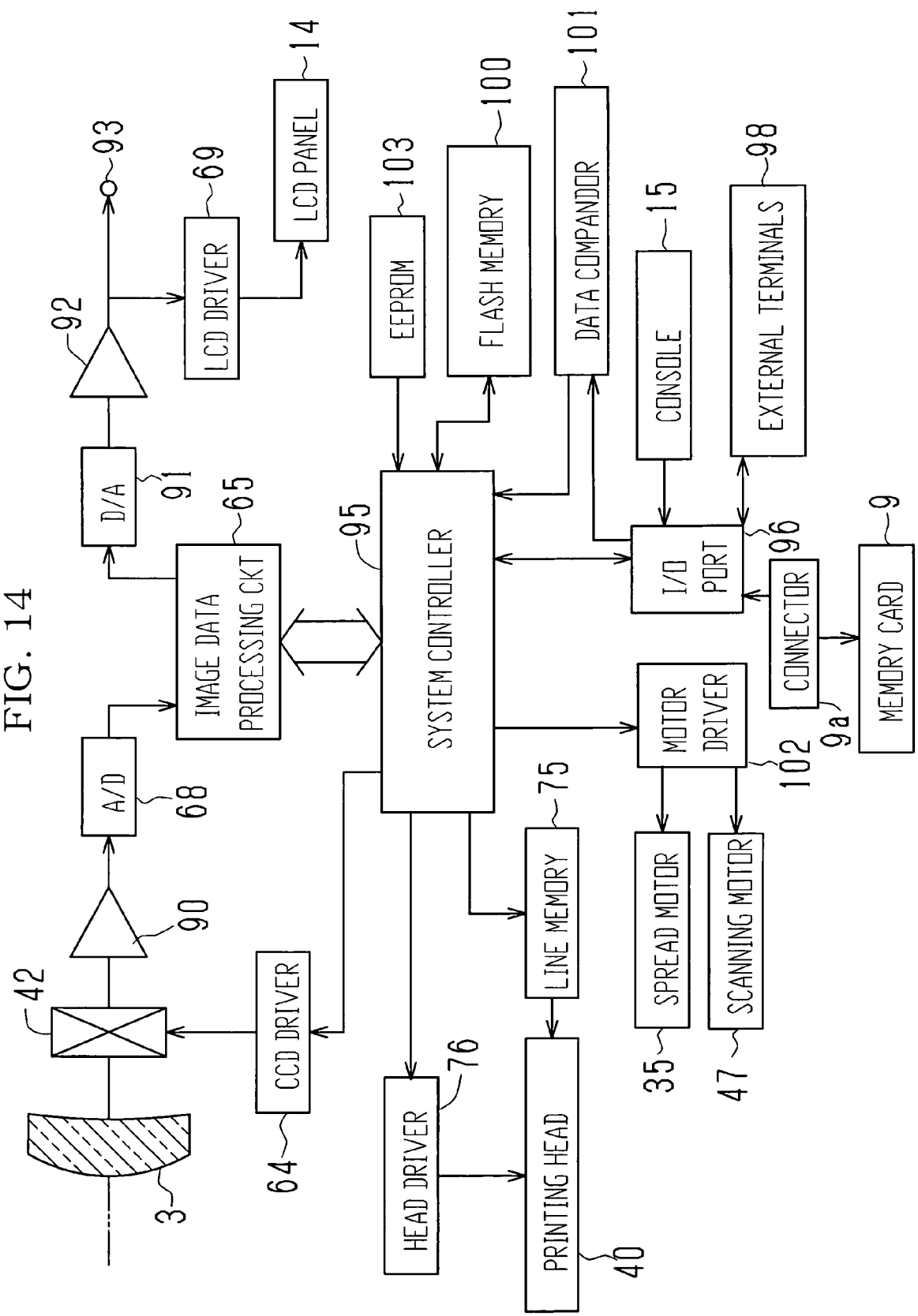
FIG. 14 is a block diagram illustrating the circuitry of a printer-incorporated electronic still camera, according to another embodiment of the present invention.

FIG. 14 schematically shows the circuitry of an electronic still camera according to the second embodiment of the present invention. The same elements as used in the above embodiment are designated by the same reference numbers, so detailed description of these elements are omitted. In this embodiment, a printing head 40 is configured as shown in FIG. 13, but the configuration of the printing head 40 is not limited to this embodiment, but may be modified appropriately.

A CCD image sensor 42 is placed behind a camera lens 3. Micro color filters of R, G, B are arranged in a matrix on a photoelectric plane of the CCD image sensor 42. Image signals of each color are serially output from the CCD image sensor 42, amplified through an amplifier 90, and then converted by an A/D converter 68 into a digital form. Sampling timing of the A/D converter 68 is synchronized with driving timing of a CCD driver 64.

The A/D converter 68 produces digital image data from the image signal, and feeds the image data sequentially to an image data processing circuit 65. The image data processing circuit 65 processes the image data for white balance adjustment, gamma correction and so forth. The image data processing circuit 65 also produces a video signal of the NTSC standard from the processed image data, and sends it via a D/A converter 91 and an amplifier 92 to an output terminal 93. Accordingly, a continuous series of images photographed through the CCD image sensor 42 may be viewed on a home TV when it is connected to the output terminal 93.

The video signal from the amplifier 92 is fed to an LCD driver 69. The LCD driver 69 drives an LCD panel 14 that is incorporated into a pack loading door 11, so the LCD panel 14 continuously displays the subject images, serving as an electronic viewfinder.

A system controller 95 manages electric operations of all elements of the electronic still camera, including the above image data processing circuit 65. The system controller 95 monitors signals from a console 15 and external connection terminals 98 through an I/O port 96, and makes signal-processing operations in accordance with the input signals.

A flash memory 100 is a DRAM (dynamic random access memory) which is accessible at high speed, and stores the image data frame by frame, as the image data is supplied from the image data processing circuit 65. For example, the flash memory 100 has a memory capacity for storing image data of 50 frames of still images.

A memory card 9 may be connected to the system controller 96 through a connector 9a and the I/O port 96. The memory card 9 stores image data of subject images obtained through the image data processing circuit 65, frame by frame in a compressed fashion. For example the memory card 9 is capable of storing compressed image data of 50 frames. A data companding circuit 101 consisting of a data compressing section for compressing image data of photographed subjects and writing it on the memory card 9, and a data expanding section for reading compressed image data from the memory card 9 and expanding it. The data companding circuit 101 is controlled by the system controller 95. The memory card 9 is used optionally, for example when the available capacity of the flash memory 100 is not enough, or for preserving the image data. Choice of data storage medium may be done by operating the console 15. The memory card 9 may also previously store such image data in the compressed fashion that is used for synthesizing a decorative peripheral frame with the subject image to modify the contour or the pattern of the peripheral frame around the subject image, hereinafter referred to as decoration image data, wherein the decorative frame is selected from among a variety of options.

In a reproduction mode, either image data read out from the memory card 9 and then expanded through the data companding circuit 101, or image data read out from the flash memory 100 is transferred to the image processing circuit 65. Based on this image data, an image is displayed on the LCD panel 14. By connecting another memory medium to an output terminal of the external connection terminals 98, it comes to be possible to memorize image data of newly photographed image frames in the memory medium, or transfer image data from the memory card 9 to the memory medium.

A head driver 76 drives the printing head 40 under the control of the system controller 95. To the printing head 40, image data is sent from a line memory 75, for use in controlling transparency of the individual liquid crystal segments that constitute the liquid crystal array 89. EEPROM 103 previously stores various kinds of adjustment data which are referred to by the system controller 95 when the electronic still camera is operated according to a predetermined sequence. The adjustment data are adjusted to each individual electronic still camera in an inspection process after the assembly of the cameras is fished. The adjustment data includes data concerning focusing of the camera lens 3, correction data for use in printing the respective colors and so forth. A motor driver 102 drives a spreading motor 25 and a scanning motor 47 under the control of the system controller 95.

Figure 15:
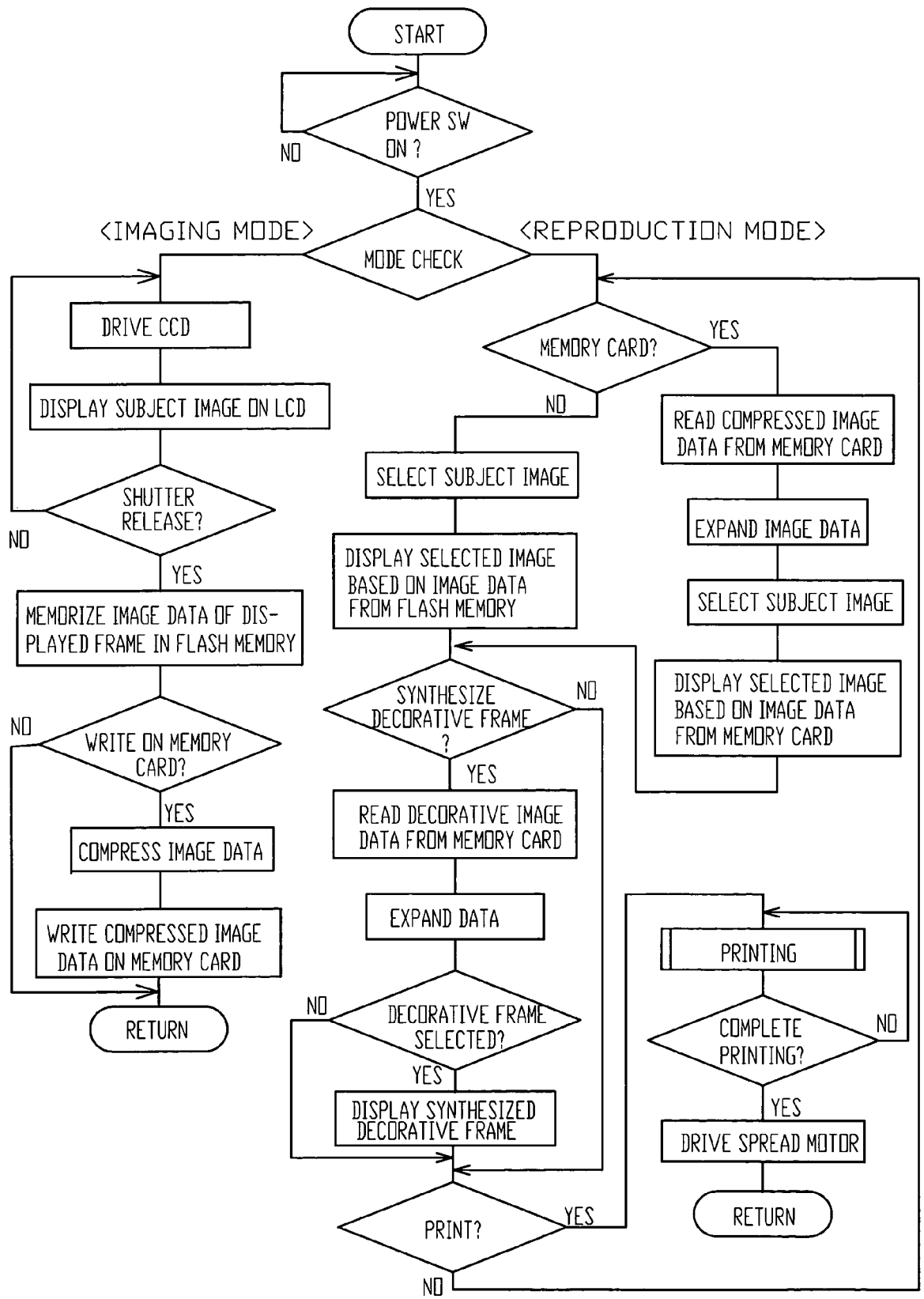
FIG. 15 is a flow chart illustrating a sequence of fundamental processes in the electronic still camera of FIG. 14.

Now, the operation of the electronic still camera of FIG. 14 will be described with reference to the flow chart shown in FIG. 15. A power switch is turned on by turning on a main switch that is provided in the console 15. Then, the present mode is set either to an imaging mode or to the reproduction mode depending upon a set position of a mode switching key in the console 15. In the imaging mode, the CCD image sensor 42 continuously photographs subject images, and the images are displayed as moving images on the LCD panel 14 that functions as an electronic viewfinder.

Upon making a release-operation on a shutter button 6, image data of a subject image displayed at that moment on the LCD panel 14 is written as a still image on the flash memory 100. The flash memory 100 is capable of storing image data of one frame sequentially upon each release-operation on the shutter button 6. It is also possible to delete image data of appropriate image frames and write image data of new image frames instead. When the memory card 9 is connected to the connector 9a, image data of appropriate image frames may be written on the memory card 9. For this purpose, the memory card 9 is designated by keying the console 15.

Figure 16A:
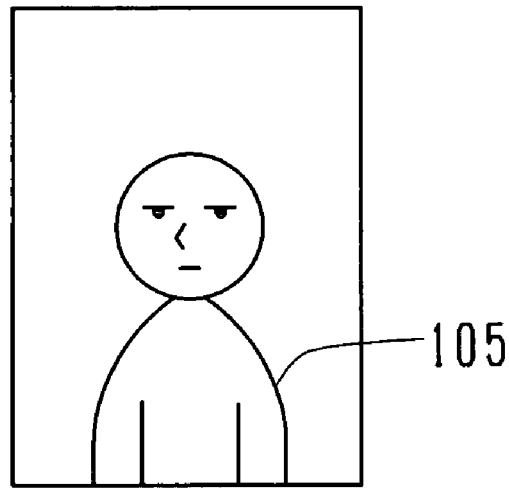
FIGS. 16A and 16B are explanatory diagrams illustrating examples of displays on an LCD panel of the electronic still camera of FIG. 14.

In the reproduction mode, an appropriate subject image is selected from among those stored in the flash memory 100 or the memory card 9 by keying the console 15. Then image data of the selected image is supplied to the LCD driver 69 through the image data processing circuit 65, the D/A converter 91 and the amplifier 92, so a subject image 105, as shown for example in FIG. 16A, is displayed on the LCD panel 14.

Figure 16B:
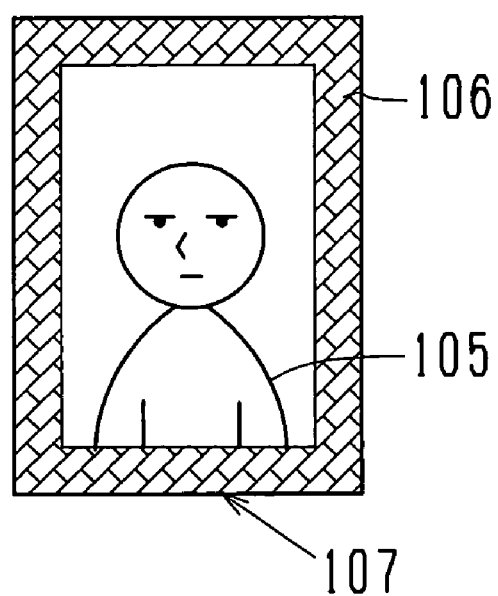

Thereafter, if it is selected to synthesize the decorative frame by keying the console 15, the decorative image data is read out from the memory card 9 and is expanded through the data expanding section 101. Thereafter, an appropriate one of 50 kinds of decorative frames. The decorative image data read out from the memory card 9 and the image data of the selected subject image 105 are transferred to the image data processing circuit 65. Then, a synthetic image 107 composed from the subject image 105 and the decorative frame 106 is displayed on the LCD panel 14, as shown for example in FIG. 16B.

When a print key is operated after the subject image, and if necessary the decorative frame, the system controller 95 accesses the memory card 9 or the flash memory 100 to read out an initial line of image data from among image data of the image 105 presently displayed on the LCD panel 14, and transfer it to the line memory 75.

When the decorative frame has been selected, the decorative image data for one line is transferred from the memory card 9 to the line memory 75. At that time, in those portions where the decorative image data overlaps the subject image data, the decorative image data has priority to the subject image data. In this way, one line of image data is written in the line memory 75. Since the printing head 40 makes exposure in the three-color frame sequential fashion in this embodiment, the image data is read out line by line sequentially from red image data that correspond to red pixels of the image to print.

After confirming that the red-pass filter portion of the color filter 57 is inserted in the printing light path, and that the liquid crystal segments of the liquid crystal array 89 are in a light-blocking condition, the system controller 95 turns on the fluorescent lamp 85. After it is confirmed that the printing head 40 is at the scanning start position, the red image data written in the line memory 75 is serially sent to the liquid crystal array 89, so the individual liquid crystal segments are sequentially switched from the light-blocking condition to respective transmittance densities that correspond to the image data. In a constant time, the individual liquid crystal segments return to the light blocking condition.

The red printing light from the red-pass filter portion of the color filter 57 travels through the LCD segments, so the instant film 30 is exposed to the red printing light of different amounts determined by the transmittance densities of the respective liquid crystal segments. It is to be noted that printing time per one line will be shortened by transferring the image data of one line concurrently from the line memory 75 to the respective liquid crystal segments of the liquid crystal array 89, and thus by switching the respective liquid crystal segments concurrently to the transmittance densities determined by the image data.

At the conclusion of the exposure to the red printing light for the first line, the scanning motor 47, that is a stepping motor, rotates through a predetermined angle, shifting the printing head 40 to a position of a succeeding line. Thereafter, red image data representative of densities of red pixels of the second line is transferred from the flash memory 100 or the memory card 8 to the line memory 75. The second line is exposed to the red printing light in the same way as for the first line. As the printing head 40 is shifted in the sub scan direction in a stepwise manner, each line is exposed to the red printing light. When a last line has been exposed to the red printing light, printing of red pixels of one frame is completed.

Then the system controller 95 sends the head driver 76 a filter change signal, to cause the color filter 57 to slide in the direction Y by an amount to position the green-pass filter portion in the printing light path. The system controller 95 accesses the flash memory or the memory card 9 to read out green image data representative of green pixels, line by line sequentially from the last line, and transfer it to the line memory 75.

Thereafter, the exposure to the green printing light is carried out in the reversed direction to the exposing direction for red, i.e. from the last line to the first line. After the completion of exposure to the green printing light, the blue-pass filter portion is inserted in the printing light path, and blue image data is read out from the flash memory 100 or the memory card 9, line by line from the first line. Thus, exposure to the blue printing light is carried out in the same way as for the exposure to the red printing light.

After the exposure to the three-color printing light is completed, the spread motor 35 is driven responsive to a signal from the system controller 95, to push out the instant film 20 by an advancing claw, and then eject it through a pair of spread rollers out of the camera body. In a few minutes, a subject image as displayed on the LCD panel 14 at the moment the print key is operated, is developed and fixed as a positive image, providing a hard copy of the subject image.

Where the decorative frame is selected, the subject image is printed inside the decorative frame.

The subject image data or the decorative image data, as read out from the memory card 9, may be temporarily written in the flash memory 100, so that they may be read out from the flash memory 100 during the printing.

It is possible to use such a memory card that stores decorative image data representative of cartoons, marks, characters, messages, and merge-print any of these besides the decorative peripheral frame. It is also possible to provide an internal memory in which decorative image data is previously written. In that case, the memory card is used for reading and writing subject image data, whereas the decorative image data for montages is read out from this memory card.

Although the present embodiment has been described on the assumption that the printing head 40 has the configuration as shown in FIG. 13, the configuration of the printing head 40 is not limited to this embodiment, but may be modified appropriately.

Figure 17:
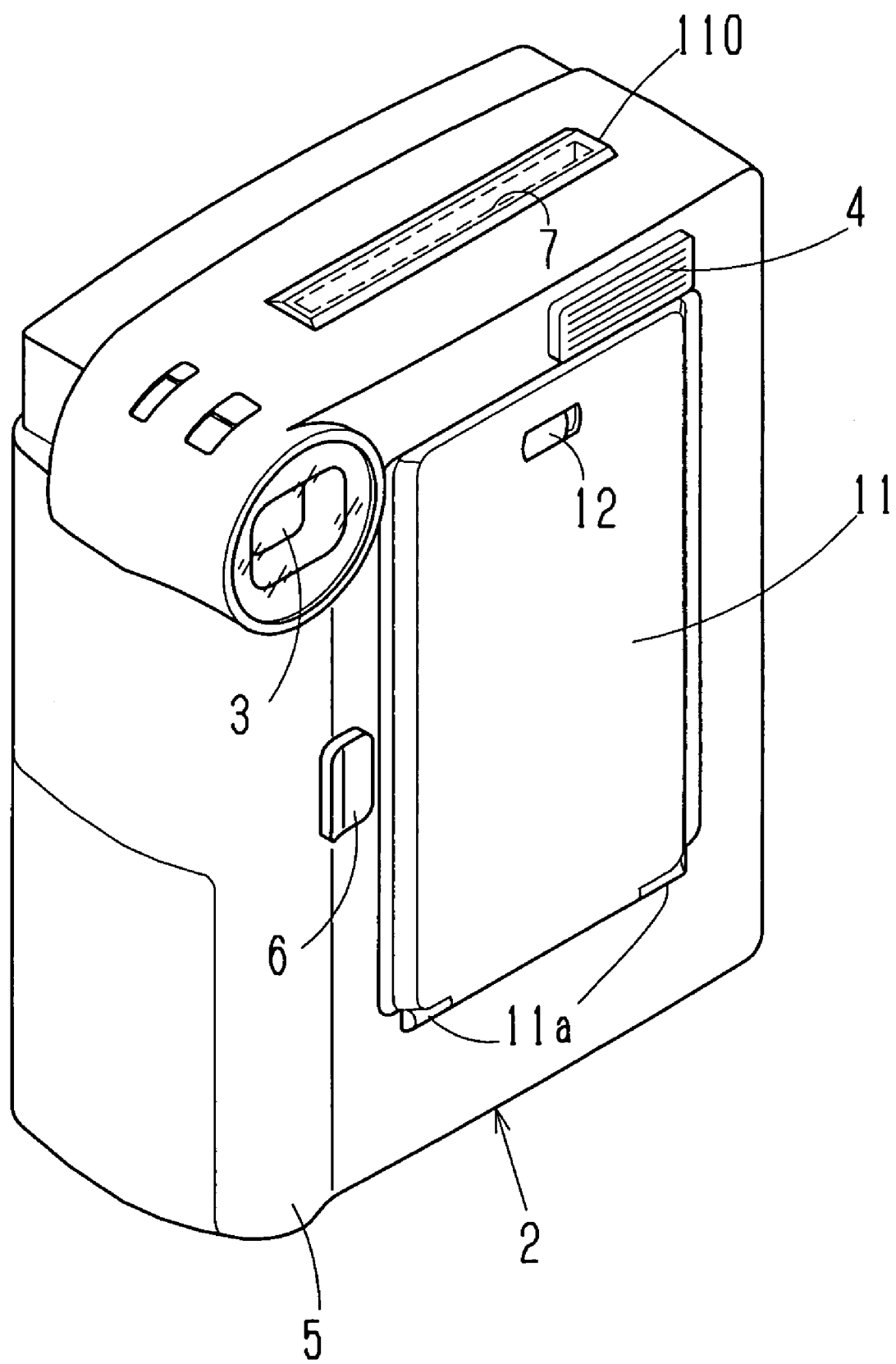
FIG. 17 is a front perspective view illustrating an electronic still camera incorporated with printer, according to a further embodiment of the present invention.
Figure 18:
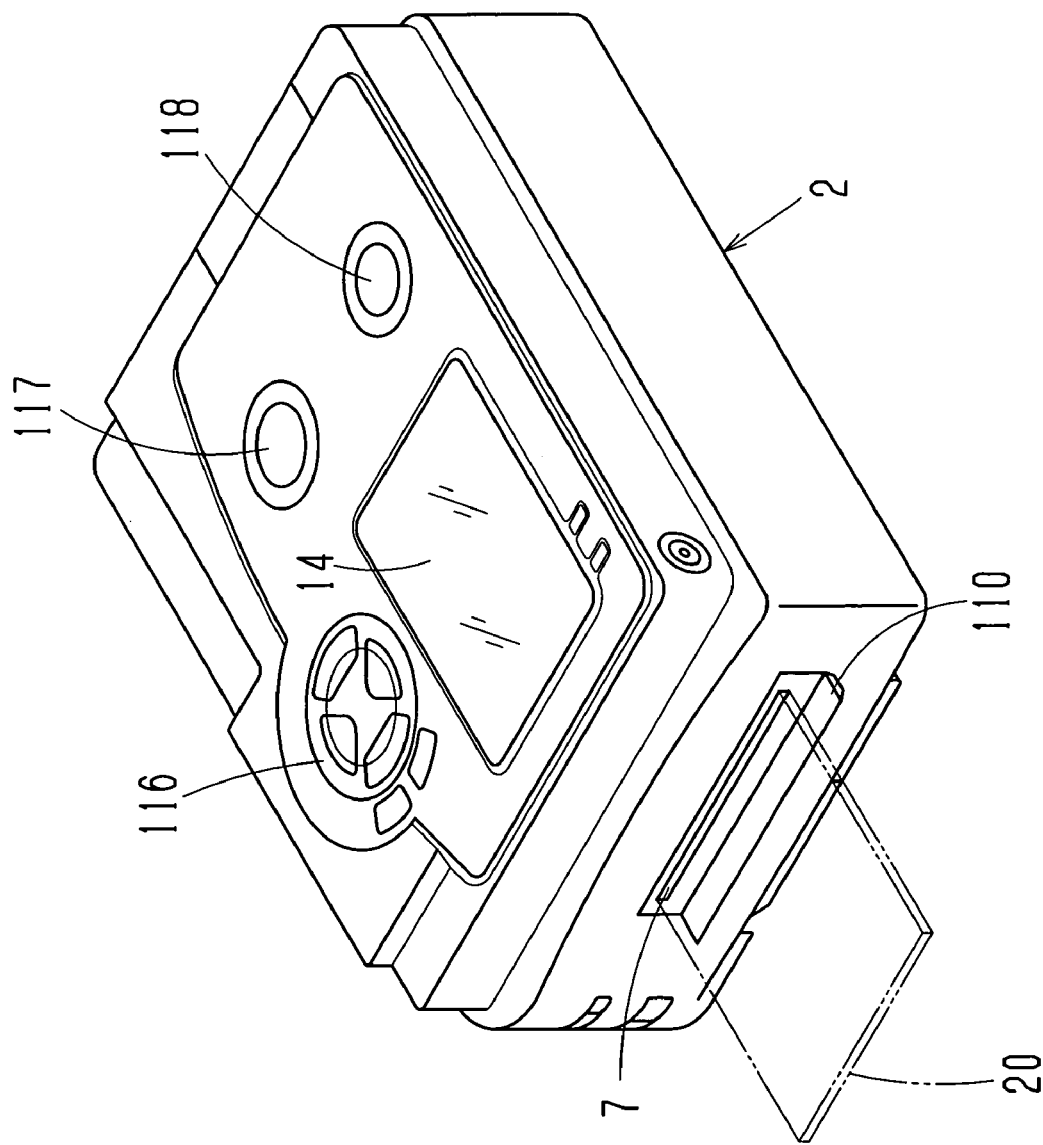
FIG. 18 is a rear perspective view illustrating the electronic still camera of FIG. 17.

FIGS. 17 and 18 show an appearance of a printer-incorporated electronic still camera, according to another embodiment of the present invention. Similar elements to those shown in the above embodiments are designated by the same reference numbers as used in the above embodiments, so detailed description about these elements is omitted. A taking lens 3 and a flash window 4 are located in upper front portions of a camera body 2. A shutter button 6 is located in a middle portion of a grip 5.

Figure 19:
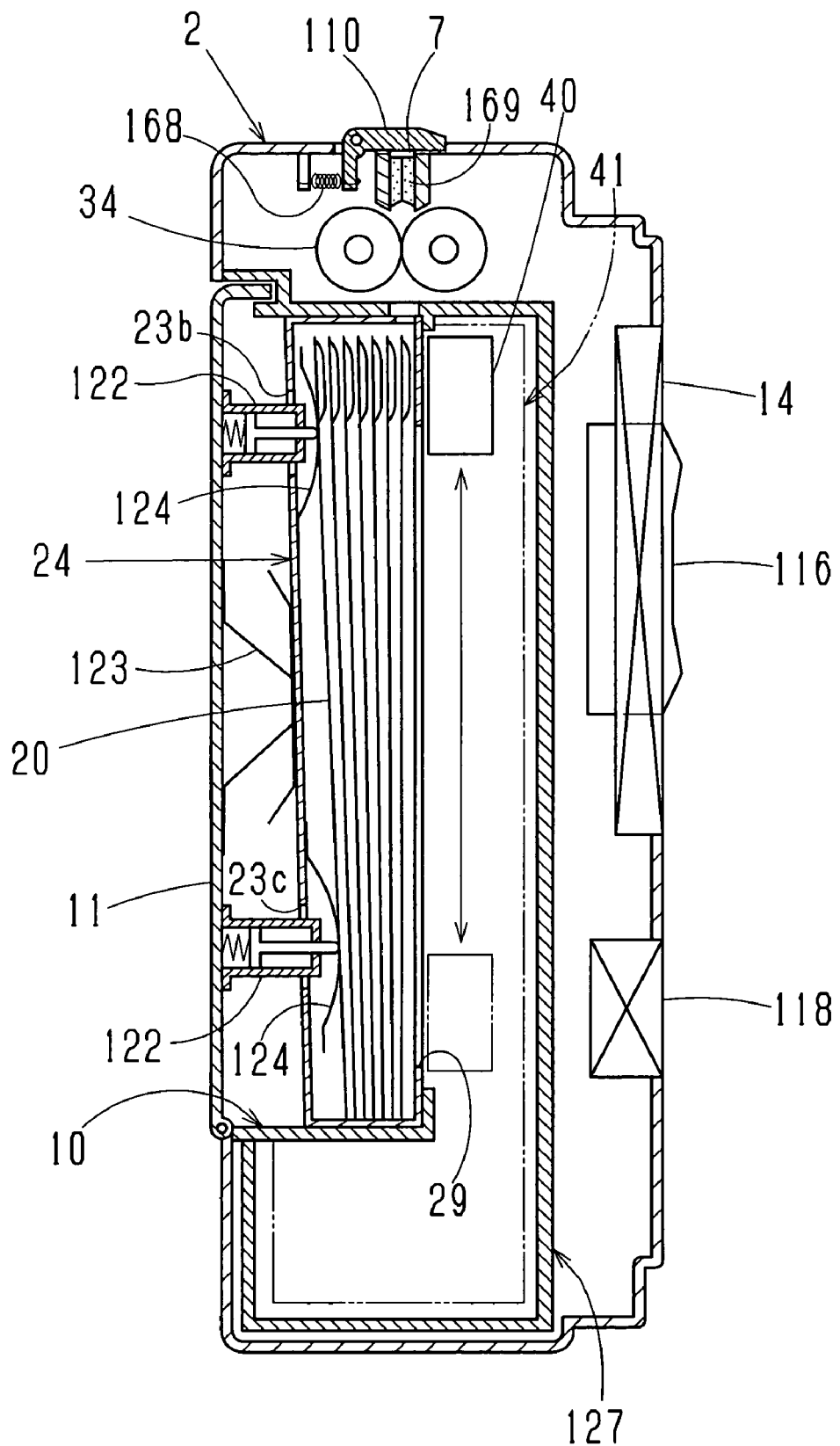
FIG. 19 is a schematic vertical section illustrating the electronic still camera of FIG. 17.

In a front center portion of the camera body 2, a pack loading door 11 is pivotally mounted through a hinge 11a. The pack loading door 11 may be opened or closed by operating a knob 12 that is provided in an upper marginal portion of the pack loading door 11. An ejection slit 7 is formed through a top face of the camera body 2, and a door member 110 for shielding the ejection slit 7 from light is mounted on the ejection slit 17 to open or close it. As shown in FIG. 19, the door member 110 is urged in a closing direction by a spring 168. To inside walls of the ejection slit 7 are attached a pair of light-shielding sponge members 169, called moltplane. After printing, the door member 110 is pushed open by a leading edge of the exposed instant film 20 that moves past the ejection slit 7, as shown in FIG. 18, letting the exposed instant film 20 out of the camera body 2.

On the back side of the camera body 2, all operating members, including the LCD panel 14, a multi-operation button 116, a mode switching key 117 and a print start key, are integrated. Accordingly, all operations for printing may be done while the camera body 2 is laid down. The multi-operation button 116 is used primary for zooming of a digital zoom system. In combination with the mode switching key 117, the multi-operation button 116 is also used for many kinds of operations in different imaging modes and for selection of an image frame on reproduction and printing. When the print start key 118 is pressed, an image displayed on the LCD panel 14 starts being printed.

As shown in FIG. 19, a pack loading chamber 10 for holding a film pack 24 is provided behind the pack loading door 11. The film pack 24 has a simplified construction, wherein leaf springs are omitted that have conventionally been provided in a case 23. The case 23 of the film pack 24 has an exposure opening 29 on its front side, and has a pair of holes 23b and 23c on its back side, for accepting a pair of pushing members 122 that are provided on a rear side of the pack loading door 11. A resilient light-shielding sheet 124 is mounted to an inside wall of the case 23, for closing the holes 23b and 23c, and thus preventing light from entering through the holes 23b and 23c. When the pack loading lid 11 is closed after the film pack 24 is put in the pack loading chamber 10, the film pack 24 is pushed from the back side by a pack pushing spring 123, which is mounted on the rear side of the pack loading door 11, to hold the film pack 24 at an inner position in the pack loading chamber 10. Simultaneously, the pushing members 122 are inserted through the holes 23b and 23c into the case 23, pushing the instant films 20 from the back toward the exposure opening 29. It is to be noted that the film pack 24 of this type is also enclosed in a moisture- and light-tight bag made of a plastic film or another material that is moisture- and light-shielding properties, when the film pack 24 is on the markets. Also in the unused condition, a light-shielding plate (not shown) is provided between the exposure opening 29 and an uppermost one of the instant films 20.

Since the light-shielding sheet 24 is pushed by the pushing member 122 when the film pack 24 is loaded in the pack loading chamber 10, a little gap is provided between the light-shielding sheet 24 and the inside wall of the case 23. However, because the back side of the instant film 20 has a light-shielding properties, and the pack loading chamber 10 is closed light-tightly by the pack loading door 11, any light would not enter through the holes 23b and 23c after the loading of the film pack 24.

A light-shielding housing 127 is formed behind the pack loading chamber 10 integrally with the pack loading chamber 10. The light-shielding housing 127 covers up the entire periphery of an instant printer section, to shield any kind of extraneous light that could reach a photosensitive surface of the instant film 20. As such extraneous light, there is light leaking through a gap between the camera body 2 and the operating members, such as the printer start key 118, or light leaking from a back-light source that illuminates the LCD panel 114 from the back.

Figure 20:
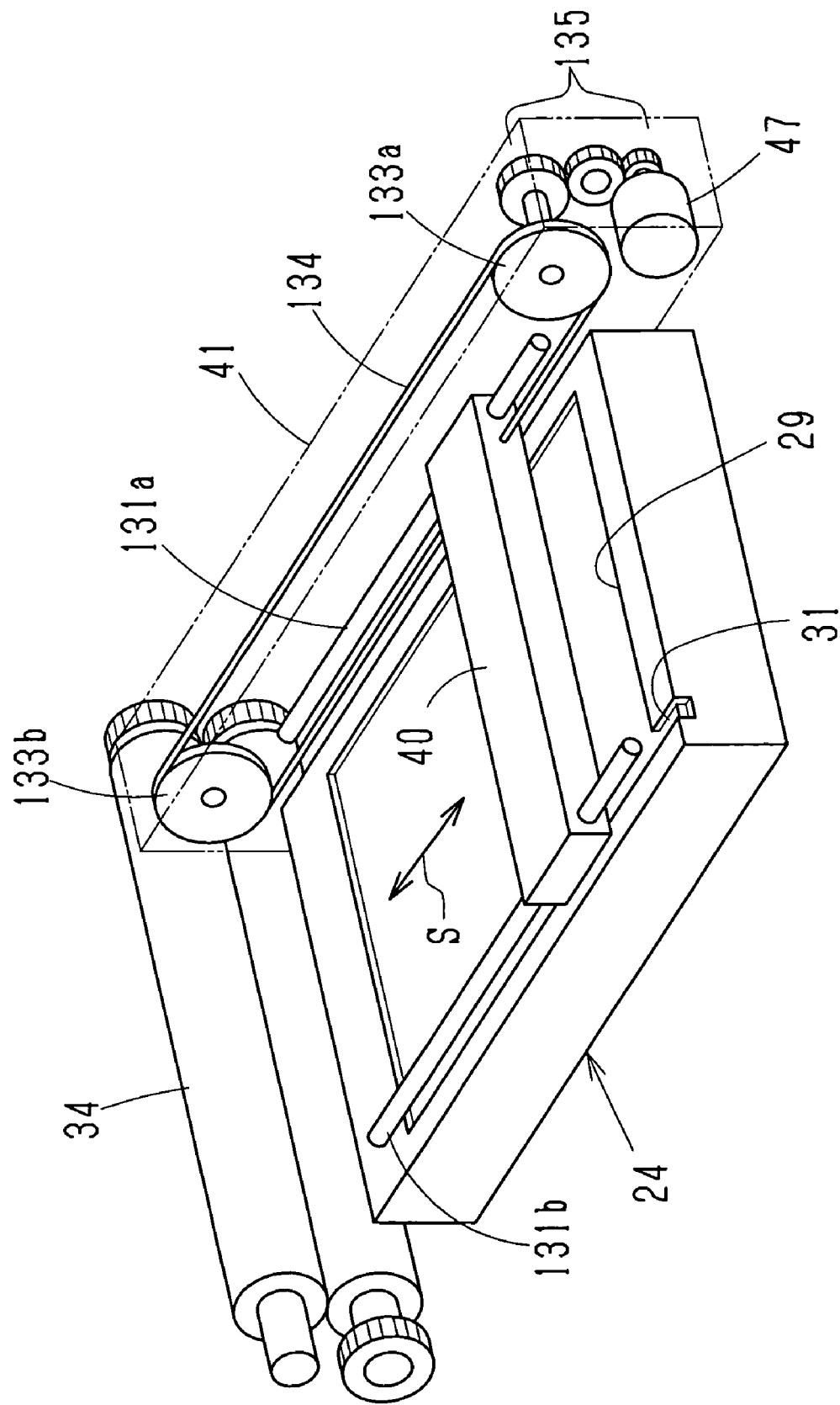
FIG. 20 is a schematic diagram illustrating another embodiment of instant printer section.

As shown in FIG. 20, the instant printer section is constituted of a printing head 40, a scanning mechanism 41 for shifting the printing head 40 along the photosensitive surface of the instant film 20, and a pair of spread rollers 34. The printing head 40 extends in a direction perpendicular to an advancing direction of the instant film 20, and has a length that is more than the width of the instant film 20. A main guide shaft 131a and a subsidiary guide shaft 131b, which extend in parallel to the film advancing direction, are put through opposite end portions of the printing head 40. Thus, the printing head 40 is movable in a sub scan direction that is parallel to the film advancing direction of the instant film 20.

To the printing head 40 are also secured opposite ends of a belt 134 that is suspended between pulleys 133a and 133b. The one pulley 133a is coupled to the scanning motor 47 through a reduction gear train 135, so the printing head 40 moves in the sub scan direction when the scanning motor 47 is driven. The printing head 40 may have any of the above described configurations.

When a reproduction-and-printing mode is selected by operating the mode switching key 117, it is displayed on a predetermined area in the LCD panel 14 whether the film loading chamber 10 is loaded with the film pack 24 or not, and how many instant films 20 remain unexposed in the film pack 24 if it is loaded in the pack loading chamber 10. If the film pack 24 is not loaded, or there is no instant film 20 in the film pack 24, the knob 12 is operated to open the pack loading door 11, for loading a new film pack 24 in the pack loading chamber 10.

By closing the pack loading door 11, the pushing members 122 enter the case 23 through the holes 23b and 23c, pushing the instant films 20 in the case 23 against an inside wall of the case 23 that surrounds the exposure opening 29. Next, the print start key 118 is pressed to cause a not-shown advancing claw mechanism and the spread rollers 34 to eject the light-shielding plate through the ejection slit 7. Thus, a photosensitive surface of the uppermost instant film 20 is exposed through the exposure opening 29, getting ready for printing.

Since the instant printer section is entirely shielded by the light-shielding housing 127, extraneous light would not reach the photosensitive surface of the instant film 20 exposed through the exposure opening 29.

When image data of an appropriate image is selected by operating the mode switching key 117 and the multi-operation button 116 in combination, the selected image is displayed on the LCD panel 14. After a subject image is selected in this way, the print start key 118 is pressed to start exposure of the instant film 20 by the printing head 40. The instant film 20 after exposure is fed to the ejection slit 7 through the advancing claw mechanism and the spread rollers 34, and is ejected through the ejection slit 7 while pushing open the door member 100. In a few minutes, a subject image as displayed on the LCD panel 14 at the moment the print start key 118 is operated, is developed and fixed as a positive image, providing a hard copy of the subject image.

Also in this embodiment, it is possible to write decorative data previously in an internal memory or a memory card, and read the decorative data to synthesize it with subject image data, for printing a composite picture.

Although the light-shielding housing covers up the entire printing section in the above embodiment, the light-shielding housing may cover up a moving range of the printing head. In that case, a light-shielding device should be provided between the printing head and the scanning mechanism, for keeping the interior of the light-shielding housing in a light-tight condition even while the printing head is moving. For example, where the scanning mechanism has the above described configurations, holes for putting the belt therethrough are formed through the light-shielding housing, so light-shielding fabric is cemented to the rim of each of these holes, to close in a gap between the rim of the hole and the belt in a light-tight fashion.

The embodiments of the present invention have been described so far with reference to the drawings, the present invention is not to be limited to the embodiments shown in the drawings. Besides the printing head, the scanning mechanism may have any configuration insofar as it can shift the printing head along the photosensitive surface of the instant film. Also the appearance and the configuration of the electronic still camera are not limited to the above embodiments.

INDUSTRIAL APPLICATION FIELD

The present invention is not only applicable to an electronic still camera incorporated with an instant printer, but also to a separate instant printer. Where the instant printer is used as a desk-top type, or where the apparatus body is not needed to be so small, a laser device may be used as a light source for the printing light, or it is possible to adopt an exposure device that scans the printing light in the main scan direction by reflecting it with a polygonal mirror. An exposure device that shifts the scanning position of the printing light in the sub scan direction by changing the angle of mirrors is also usable. The printing method of the present invention is applicable to those instant printers or those printer-incorporated electronic still cameras which make an exposure with use of printing light that is obtained from an LCD or another display device displaying a frame of image.

The present invention is not only applicable to those instant printers or those printer-incorporated electronic still cameras which use instant films of the above described mono-sheet type where the image is shown in the display area that is on the opposite side from the exposure area, but also applicable to those using another mono-sheet type where the color image is displayed in the exposure area. In that case, if an inverted image is printed on the exposure area, a displayed color image is correspondingly inverted. Therefore, image processing should be carried out for printing an erected image on the exposure area. Moreover, the present invention is usable with a peel-apart type instant film. The present invention is also applicable to those cases where the instant films are not contained in a case.

The invention claimed is:

1. An instant printer comprising an exposure device for projecting printing light based on image data, and a pair of spread rollers, wherein the instant printer records a latent image in an exposure area of a predetermined size on an instant film that includes a processing fluid, by exposing the instant film to the printing light, and develops the latent image into a positive image by spreading the processing fluid over the exposed instant film through the spread rollers, characterized in that:

the exposure device comprises a printing head for projecting the printing light linearly along a main scan direction, and a scanning mechanism for moving the printing head relative to the instant film in a sub scan direction perpendicular to the main scan direction, wherein an illumination range of the printing light by the printing head is longer in the main scan direction than a length in the main scan direction of the exposure area, whereas a sub scanning range by the scanning mechanism is longer than a length in the sub scan direction of the exposure area.

2. An instant printer according to claim 1, wherein the instant film is contained in a case that is formed with an exposure opening for exposing the exposure area, and the size of the illumination range relative to the exposure area is determined in accordance with clearances provided between the case and the instant film.

3. An instant printer according to claim 2, wherein the printing head is at least partly inserted in the exposure opening.

4. An instant printer according to claim 3, wherein the exposure opening is larger than the exposure area, whereas the illumination range of the printing head is confined in the exposure opening when the case is loaded in a loading chamber.

5. An instant printer according to claim 1, wherein the printing head is moved from a scanning start position that is located before the exposure area in the sub scan direction, to a scanning end position that is beyond the exposure area in the sub scan direction, and is driven based on image data of one frame line sequentially from the scanning start position to the scanning end position, to accomplish one sub scanning.

6. An instant printer according to claim 5, wherein the printing head is designed to record a number of pixels along a line extending in the main scan direction, the number being more than a necessary number for recording pixels through the entire length of the exposure area in the main scan direction, and wherein drive data corresponding to the pixels of one line recorded by the printing head is produced from the image data.

7. An instant printer according to claim 1, further comprising a device for connecting an external memory to the instant printer, and a device for reading out image data stored in the external memory, wherein the exposure device may be driven based on the image data read out from the external memory.

8. An instant printer according to claim 7, further comprising an imaging device for photographing a subject, wherein an image of a subject photographed through the imaging device is recorded on the instant film by driving the exposure device based on image data obtained from the imaging device.

9. An instant printer according to claim 8, further comprising a device for compressing image data of a subject photographed through the imaging device and writing it on the external memory, and a device for expanding compressed image data as it is read out from the external memory, wherein the exposure device may be driven based on the expanded image data.

10. An instant printer according to claim 9, further comprising a device for synthesizing image data read out from the external memory with image data photographed through the imaging device, wherein the exposure device may be driven based on the synthesized image data.

11. The instant printer of claim 1, wherein a photosensitive area of the instant film has dimensions less than overall dimensions of the instant film, so that the exposure area cannot extend to outer boundaries of the instant film.

12. A printing method for recording a latent image in an exposure area of a predetermined size on an instant film that includes a processing fluid, by projecting printing light from an exposure device onto the instant film based on image data, and developing the latent image into a positive image by spreading the processing fluid over the exposed instant film through a pair of spread rollers, characterized in that:

an illumination range of the printing light on the instant film by the exposure device is determined to be larger than the exposure area, so the entire exposure area may be exposed even where the instant film deviates from a predetermined position relative to the exposure device;

wherein the instant film is contained in a case that is formed with an exposure opening for exposing the exposure area, and the size of the illumination range relative to the exposure area is determined in accordance with clearances provided between the case and the instant film.

13. The printing method of claim 12, wherein a photosensitive area of the instant film has dimensions less than overall dimensions of the instant film, so that the exposure area cannot extend to outer boundaries of the instant film.

* * * * *